US005584442A

United States Patent [19]
Watkins et al.

[11] Patent Number: 5,584,442
[45] Date of Patent: *Dec. 17, 1996

[54] APPARATUS AND METHOD FOR PREPARING STRIPS OF WEB AND WINDING THEM INTO A CARTRIDGE

[75] Inventors: Joseph A. Watkins; Joseph E. Yokajty, both of Rochester; Thomas A. Sisson, Hilton; Thomas P. Melanson, Rochester, all of N.Y.

[73] Assignee: Eastman Kodak Company, Rochester, N.Y.

[ * ] Notice: The term of this patent shall not extend beyond the expiration date of Pat. No. 5,584,441.

[21] Appl. No.: 428,772

[22] Filed: Apr. 24, 1995

[51] Int. Cl.$^6$ .................................................. B65M 18/10
[52] U.S. Cl. ................................ 242/348.1; 242/532.2; 242/532.6
[58] Field of Search ........................... 242/348.1, 526.3, 242/532.2, 532.7, 548.3, 548.4, 908, 348, 348.4, 548, 417, 417.1, 417.2, 417.3, 532.4, 532.6, 538, 538.1, 538.2, 538.3, 538.4; 226/7, 21, 91, 92, 97

[56] References Cited

U.S. PATENT DOCUMENTS

| | | | |
|---|---|---|---|
| 3,087,664 | 4/1963 | Streeter | 226/97 |
| 3,156,398 | 11/1964 | Lauxen et al. | 226/97 |
| 3,323,754 | 6/1967 | Nixdorf et al. | 242/147 |
| 3,712,553 | 1/1973 | Napor et al. | 242/532.6 |
| 3,910,516 | 10/1975 | Hoffacker et al. | 242/532.6 |
| 3,979,079 | 9/1976 | Ohashi et al. | 242/417.3 |
| 4,071,177 | 1/1978 | Burdorf | 226/7 |
| 4,142,661 | 3/1979 | Nettles et al. | 226/97 |
| 4,147,287 | 4/1979 | Reba | 226/7 |
| 4,182,472 | 1/1980 | Peekna | 226/97 |
| 4,197,972 | 4/1980 | Daane | 226/97 |
| 4,200,211 | 4/1980 | Yamagishi et al. | 226/21 |
| 4,305,536 | 12/1981 | Burdorf et al. | 226/1 |
| 4,432,221 | 2/1984 | Barten | 72/148 |
| 4,444,531 | 4/1984 | Baker et al. | 406/88 |
| 4,448,369 | 5/1984 | Watanabe . | |
| 4,520,645 | 6/1985 | Ross et al. | 72/250 |
| 4,553,712 | 11/1985 | Krywiczanin et al. . | |
| 4,726,502 | 2/1988 | Cryderman | 226/97 |
| 4,790,468 | 12/1988 | Nakashima et al. | 226/97 |
| 4,842,177 | 6/1989 | Callender et al. | 226/97 |
| 4,903,907 | 2/1990 | Yokajty et al. | 226/97 X |
| 4,925,077 | 5/1990 | Daane et al. | 226/97 |
| 4,957,247 | 9/1990 | Nakamura et al. | 242/532.7 |
| 5,031,852 | 7/1991 | Dowling et al. | 354/275 X |
| 5,125,630 | 6/1992 | Hoyt et al. | 242/528.3 |
| 5,163,633 | 11/1992 | Watkins | 242/532.6 |
| 5,209,387 | 5/1993 | Long et al. | 226/97 |
| 5,215,273 | 6/1993 | Greene | 354/275 X |
| 5,224,641 | 7/1993 | Spicer | 226/97 |
| 5,301,892 | 4/1994 | Merz et al. | 242/532.2 |
| 5,347,334 | 9/1994 | Smart et al. | 354/275 |

FOREIGN PATENT DOCUMENTS

0582852A1  2/1994  European Pat. Off. .

*Primary Examiner*—John P. Darling
*Attorney, Agent, or Firm*—Clyde E. Bailey, Sr.; Charles E. Snee, III

[57] ABSTRACT

Apparatus for winding a strip (58) of web into a cartridge (40), the cartridge including an enclosing shell (42, 44); a spool (46) mounted for rotation within the shell, the spool being engageable externally of the cartridge (51, 53) for rotation; the spool comprising a core (54) with features (56) for attaching an end (60) of the strip to the core; an axially extended opening (50) through the shell for advancing or withdrawing the strip; and a light-shielding door (52). A shuttle mechanism (86) has a vacuum head (88) which grips the strip and moves the end to a position for engagement by a tool (94) positioned outside the opening, after which the tool inserts the end into the cartridge and attaches it to the core. A winding motor (354) rotates the spool to draw the strip into the cartridge. During the winding, a rotatable air bar (92) adjusts the path of the strip to prevent contact with the peripheral edges or walls of the opening.

28 Claims, 19 Drawing Sheets

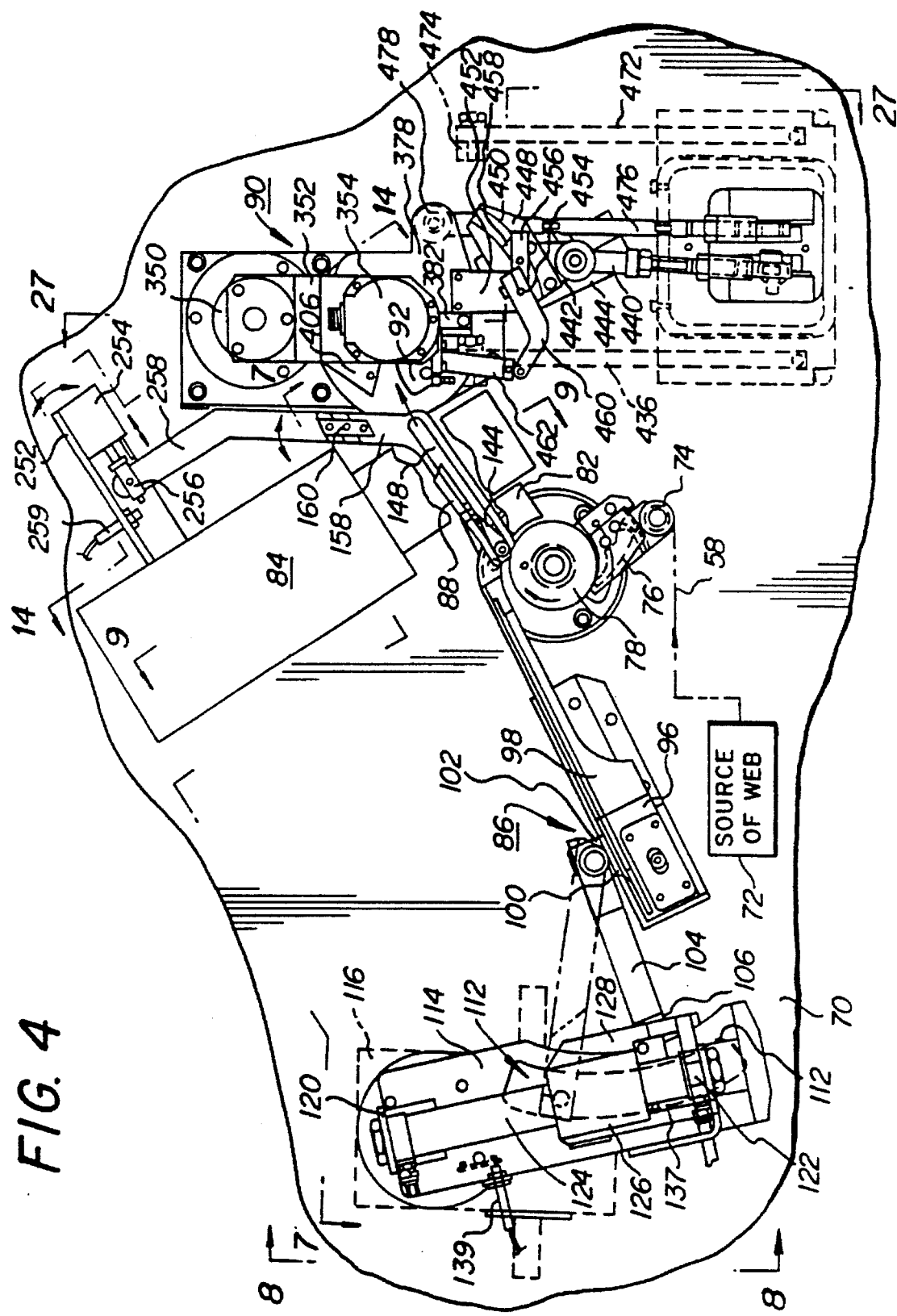

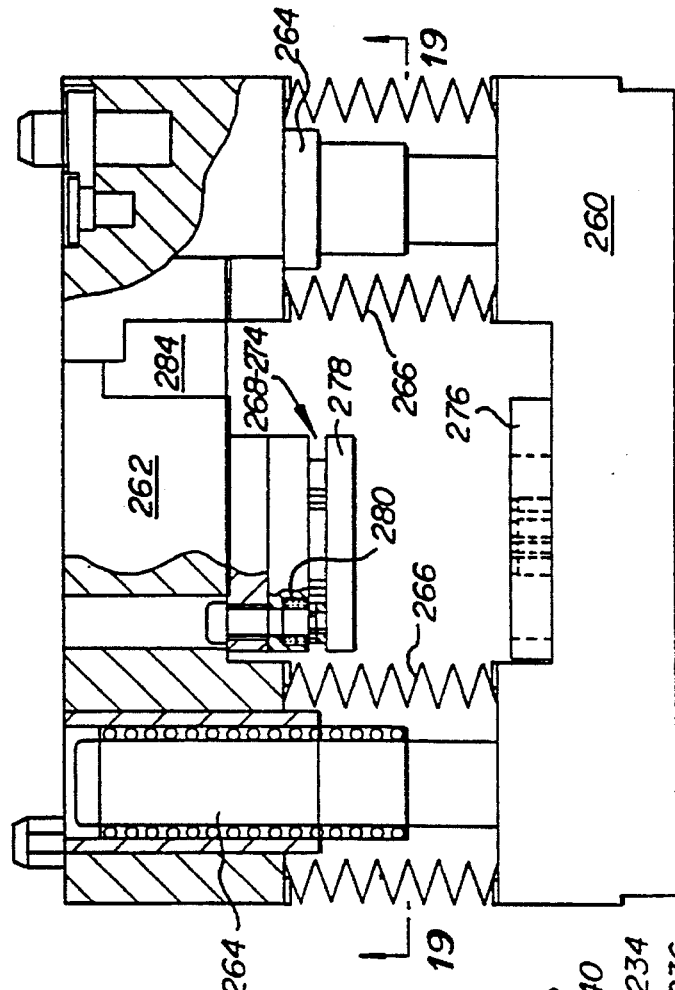
FIG. 15
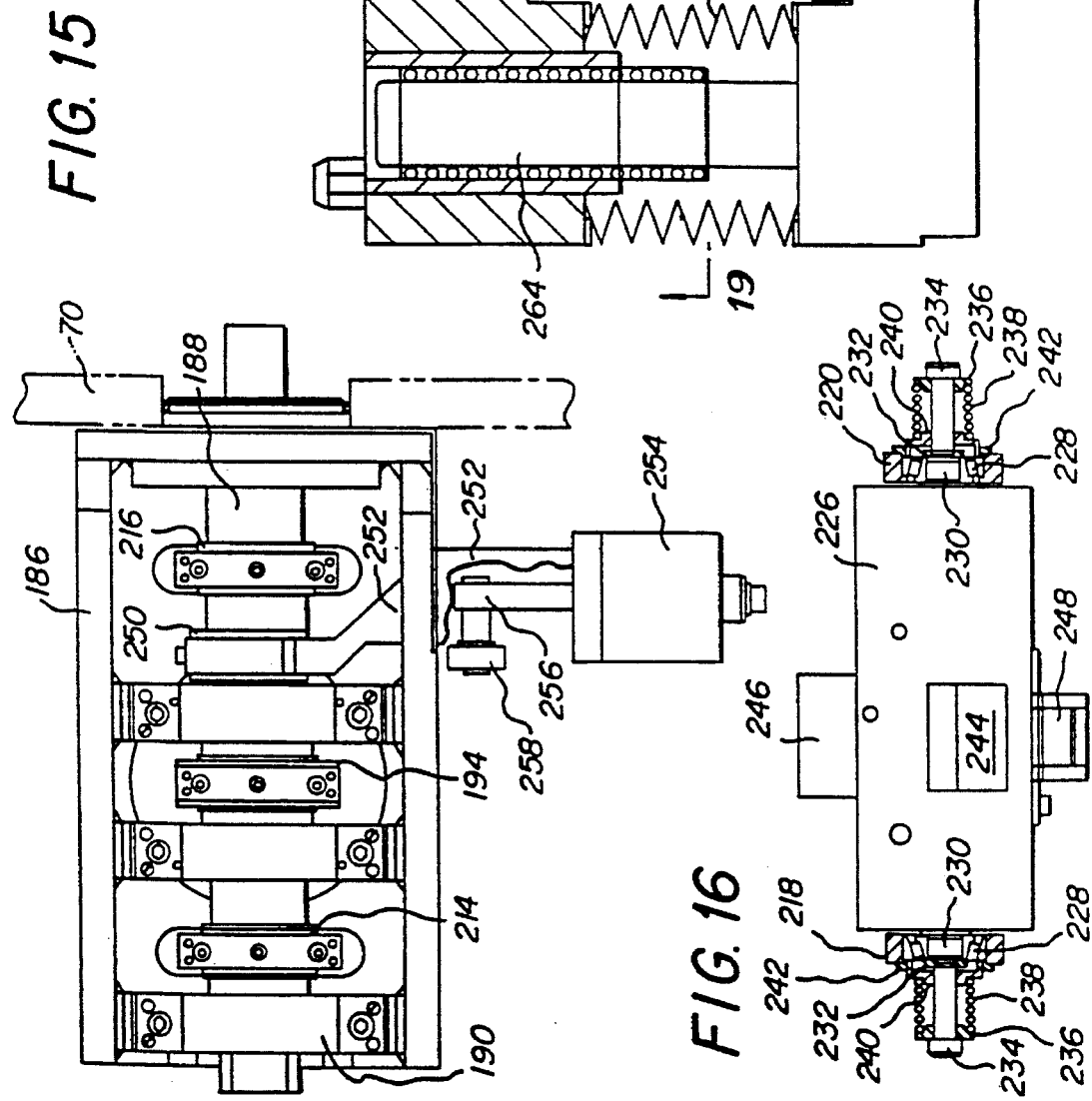
FIG. 16
FIG. 17

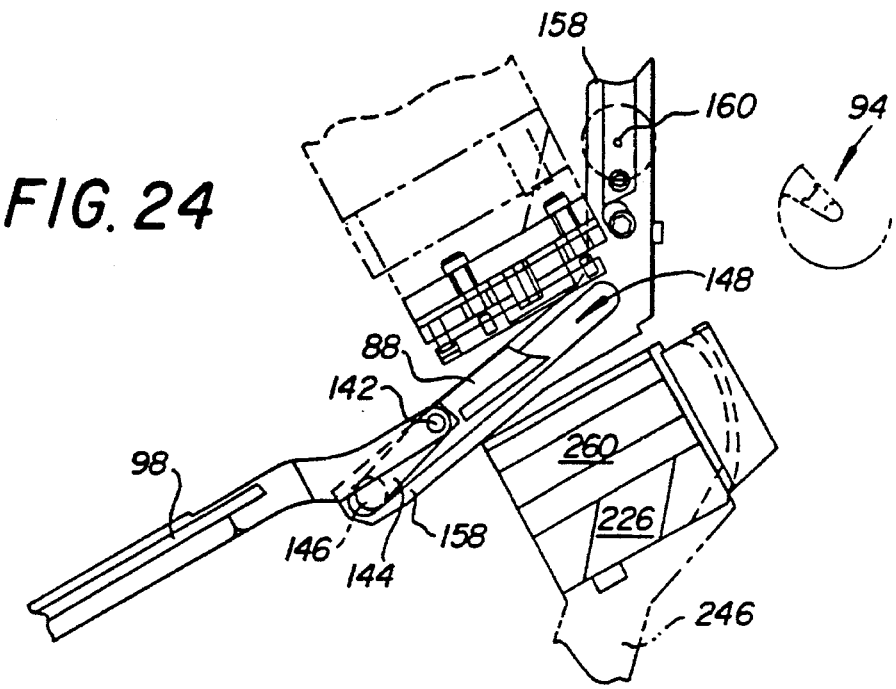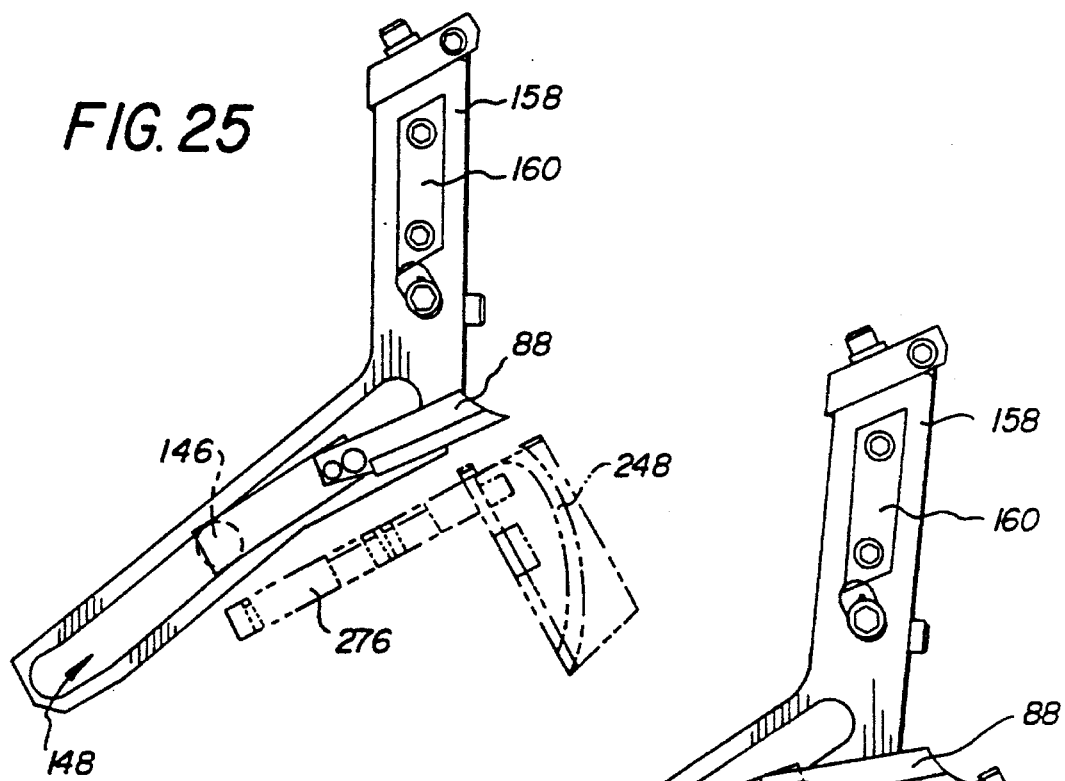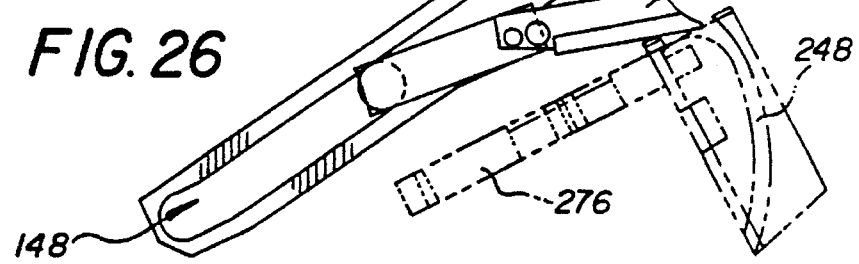

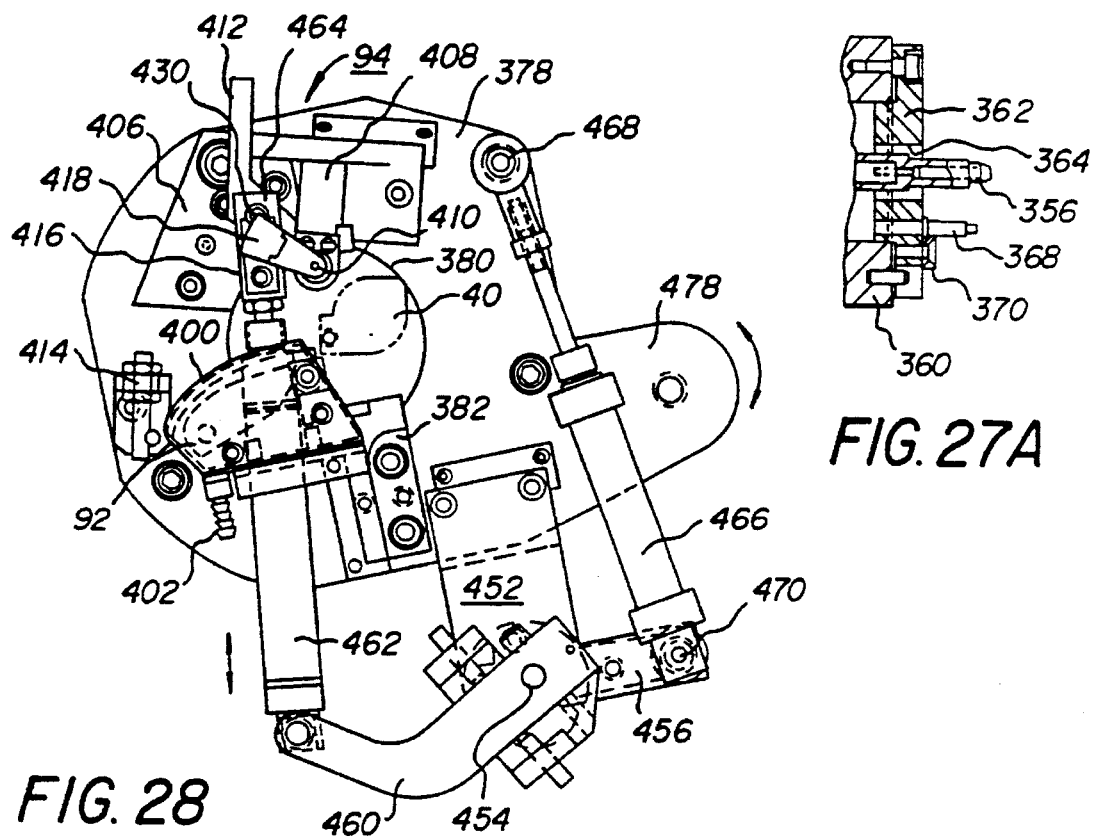
FIG. 28
FIG. 27A
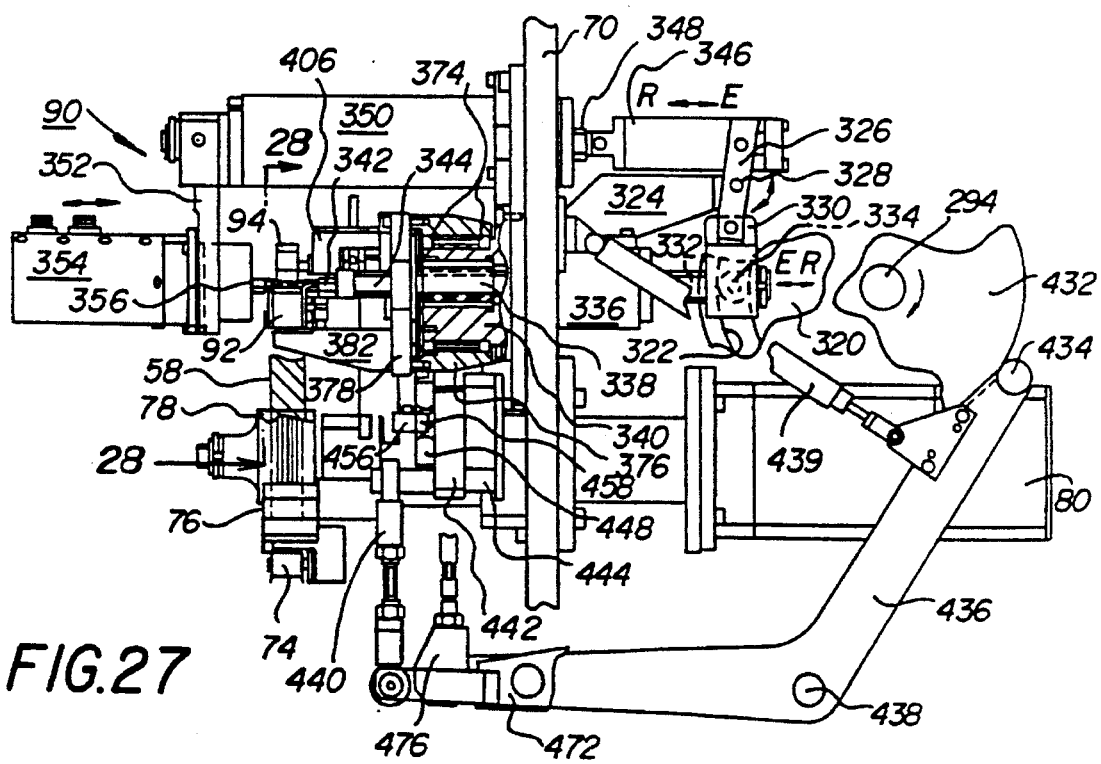
FIG. 27

APPARATUS AND METHOD FOR PREPARING STRIPS OF WEB AND WINDING THEM INTO A CARTRIDGE

DESCRIPTION

1. Cross-Reference to Related Applications

This application is related to the following concurrently filed applications: (a) Ser. No. 08/427,531 for Apparatus and Method for Spooling Strips of Web into a Cartridge by Joseph A. Watkins, Thomas A. Sisson, Joseph E. Yokajty and Thomas P. Melanson; (b) Ser. No. 08/427,377 for Apparatus for Preparing and Feeding Strips of Web by Joseph A. Watkins and Thomas A. Sisson; and (c) Ser. No. 08/427,510 for Apparatus for Cutting Strips of Web by Joseph A. Watkins and Thomas A. Sisson.

2. Technical Field

The invention concerns apparatus and methods for winding strips of material into cartridges. More particularly, the invention relates to such apparatus and methods which are useful for final finishing operations on photographic film.

3. Background Art

Cartridges for wound rolls of web material are known which require that the web be wound into a preassembled cartridge. The web must be inserted through an opening in a wall of the cartridge, attached to a spool inside the cartridge and then wound into the cartridge to form a wound roll. Particularly in such cartridges for photographic film, the opening is narrow and at least partially obstructed by a light-shielding door. Because of desired high winding speeds, which require higher tension than would be seen in a camera, and because of the narrowness of this opening, scratching of the film has been a great cause of concern. Also, the attachment end of the film must be reliably presented at a winding station, to facilitate engagement by a tool for attaching the film to the spool. And, some tension must be maintained on the film during its insertion into the cartridge and attachment to the spool, to ensure that the film will not disengage from the attachment tool.

SUMMARY OF THE INVENTION

The primary objective of the invention is to provide an apparatus and method for quickly and reliably winding strips of material, such as photographic film, into a preassembled cartridge, without damaging the strip by contact with the shell of the cartridge.

These objectives are given only by way of illustrative examples; thus other desirable objectives and advantages inherently achieved by the disclosed invention may occur or become apparent to those skilled in the art. Nonetheless, the scope of the invention is to be limited only by the appended claims.

The method of the invention is particularly suited for winding a strip of web into a cartridge, the cartridge including an enclosing shell; a spool mounted for rotation within the shell; the spool being engageable externally of the cartridge for rotation; the spool comprising a core with features for attaching an end of the strip of web; an axially extended opening through the shell for advancing the strip of web into or withdrawing the strip of web from the shell; and a selectively openable and closeable door for the opening. In a broad sense, the method comprises steps of gripping the length of web near the end to be attached to the spool; while gripping the length of web, moving the end toward the opening; outside the opening, engaging the end and then ungripping the length; while engaging the end, inserting the end through the opening and attaching the end to the core; rotating the spool to draw the length of web along a path through the opening into the cartridge and to wind the length of web onto the spool; and during the rotating, adjusting the direction of the path to prevent the web from contacting peripheral edges or walls of the opening.

The apparatus of the invention is useful for winding strips of web into the same sort of cartridge. In its broadest sense, the apparatus may comprise a frame; shuttle means for gripping a length of web near an end to be attached to the spool and for moving the end relative to the frame and toward the opening into the cartridge; means, positioned outside the opening, for engaging the end, inserting the end through the opening and attaching the end to the core; means for rotating the spool to draw the length of web along a path through the opening and into the cartridge and to wind the length of web onto the spool; and means, effective during the rotating, for adjusting the path of movement of the web into the cartridge to prevent the web from contacting peripheral edges of the opening. Means may be provided for holding the cartridge stationary relative to the frame, during winding of the strip into the cartridge.

Numerous advantages are provided by the invention. Synchronous operation of the shuttle mechanism, the punch and die press and the attachment tool permit high speed loading of preassembled cartridges. Adjusting the path of movement of the strip as it is wound into the cartridge eliminates scratching of the film. Due to use of a single driven line shaft, mechanical synchronization of the shuttle mechanism with the press, the attachment tool and the rotatable air bar eliminates danger of collisions between the shuttle mechanism and the punch and die press or the air bar or the attachment tool. Tension is maintained on the web during attachment, to prevent disengagement from the attachment tool. The linkage for actuating the attachment tool is configured to allow rotation of the air bar without moving the attachment tool from its disengaged position.

BRIEF DESCRIPTION OF THE DRAWINGS

The foregoing and other objectives, features and advantages of the invention will be apparent from the following more particular description of the preferred embodiments of the invention, as illustrated in the accompanying drawings.

FIG. 4 shows an elevation view, partially broken away and partially in phantom, of an apparatus for preparing strips of photographic film and winding them into a cartridge.

FIG. 15 shows a top view, partially broken away, taken along line 15—15 of FIG. 14.

FIG. 16 shows a view of tile lower press platen, taken along line 16—16 of Figure 14.

FIG. 17 shows a front elevation view of the punch and die set, looking upstream.

FIG. 24 shows a fragmentary elevation view of the shuttle mechanism with the vacuum head withdrawn upstream of the punch and die, to permit the film strip to pass through for winding.

FIG. 25 shows a fragmentary elevation view of shuttle mechanism with the vacuum head poised above a removal chute for rejected strips of film.

FIG. 26 shows a fragmentary elevation view of the shuttle mechanism with the vacuum head lowered to insert a rejected film strip into a removal chute.

FIG. 27 shows an elevation, sectional view, partially broken away, of the winding station of the invention, taken along line 27—27 of FIG. 4.

FIG. 27A shows a fragmentary elevation, sectional view of an inboard end of the winding motor of FIG. 27.

FIG. 28 shows an elevation view or the winding station, taken along line 28—28 of FIG. 27, just before the film strip is engaged for insertion into a cartridge, with the vacuum head and winding quill omitted for ease of illustration.

DESCRIPTION OF THE PREFERRED EMBODIMENTS

Figure 2:
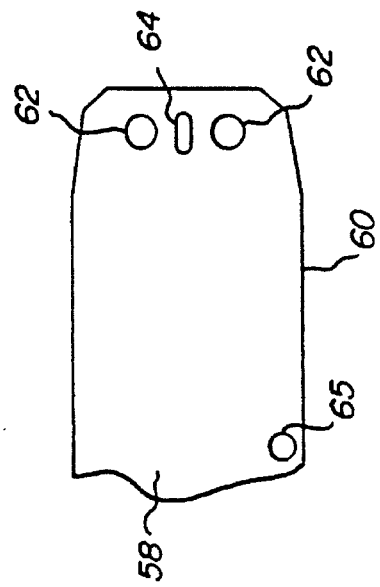
FIG. 2 shows a fragmentary plan view of an end of a film strip which can be attached to a spool within the cartridge of FIG. 1.

The following is a detailed description of the preferred embodiments of the invention, reference being made to the drawings in which the same reference numerals identify the same elements of structure in each of the several Figures.

Figure 1:
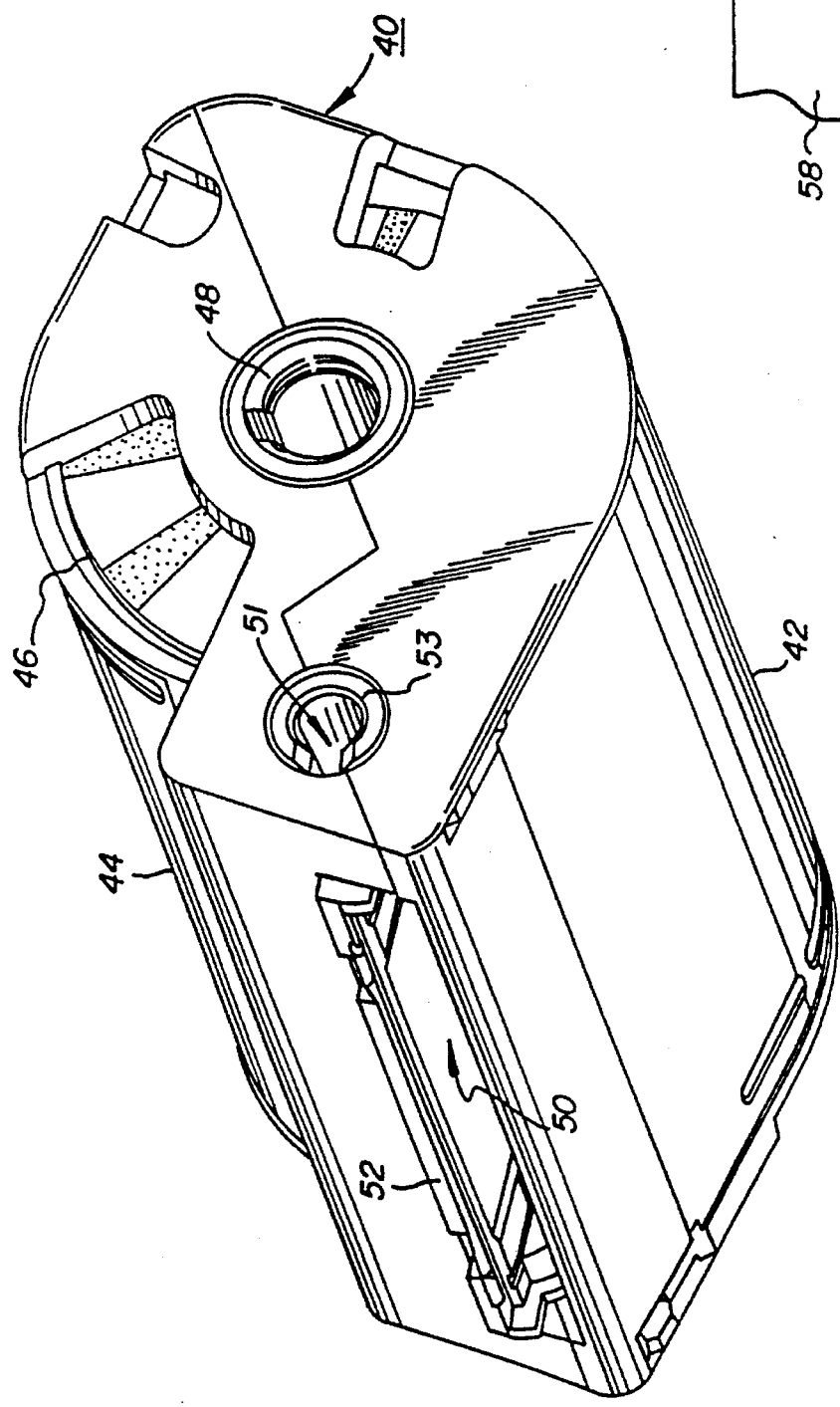
FIG. 1 shows a perspective view of a photographic film cartridge of a type which can be loaded using the apparatus and method of the invention.
Figure 34:
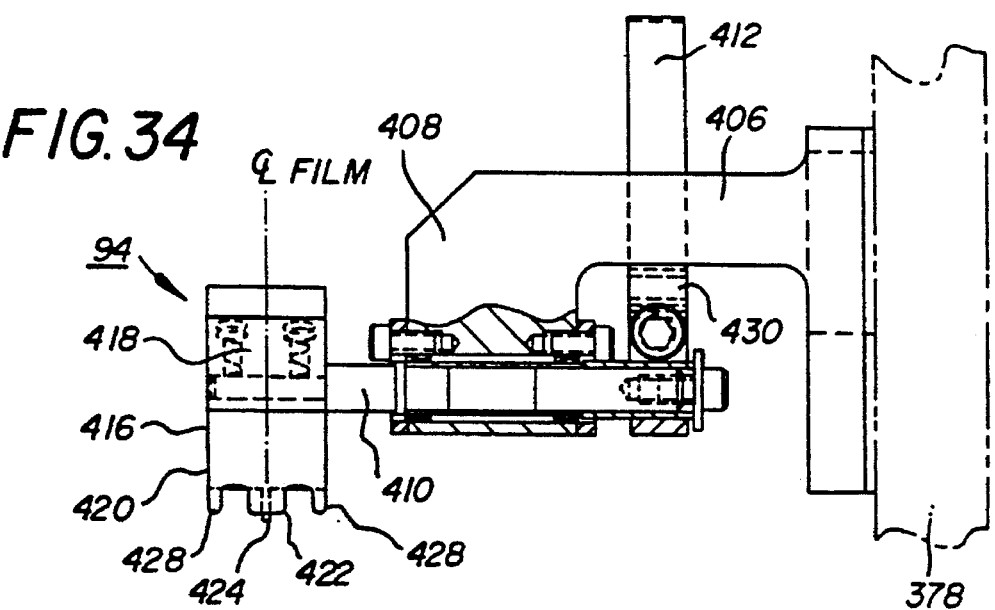
FIG. 34 a side elevation view, partially in section, of a tool for engaging, inserting and attaching a film strip.

FIG. 1 shows a film cartridge 40 which can be loaded using the method and apparatus of the invention. Such cartridges are disclosed, for example, in commonly assigned U.S. Pat. Nos. 5,031,852; 5,215,273; and 5,347,334. Although cartridges for photographic film will be discussed in this specification, those skilled in the art will appreciate that webs of virtually any type may be loaded into cartridges, without departing from the scope of the invention. The cartridge includes first and second shell halves 42, 44 which are fastened together to enclose and rotatably mount a spool 46, only an end flange of which is visible in the figure. To permit spool 46 to be rotated from outside the cartridge, an axially extended hub 48 extends through an opening in an end wall of the cartridge liar engagement by a suitable winding apparatus. A similar hub, not illustrated, is provided for engagement of the opposite end of the spool. A strip of photographic film may, be inserted into and removed from the cartridge through an axially extended opening 50 through the shell. In the illustrated cartridge, opening 50 may be closed by a selectively openable and closeable light-shielding door 52, shown in its open position in FIG. 1. The door may be closed by a tool, not illustrated, which engages a bore 51 in a hub 53 which extends through the shell of the cartridge. Of course, cartridges not having such a door may be loaded using the method and apparatus of the invention. As shown schematically in FIG. 3, spool 46 includes a central core 54 which includes a longitudinal slot having attachment features 56 for engagement with a length 58 of photographic film, shown fragmentarily in FIG. 2. Length 58 includes an attachment end 60 having a pair of attachment openings 62 for engaging features 56 when the length is attached to core 54. An oblong drive opening 64 is provided between openings 62 for engagement by a tool 94 illustrated in FIGS. 34 and 35, to be discussed subsequently. Spaced longitudinally from openings 62, 64 and near one longitudinal edge of length 58 is a further opening 65 which is detected by equipment, not illustrated, for processing the film after exposure.

Figure 3:
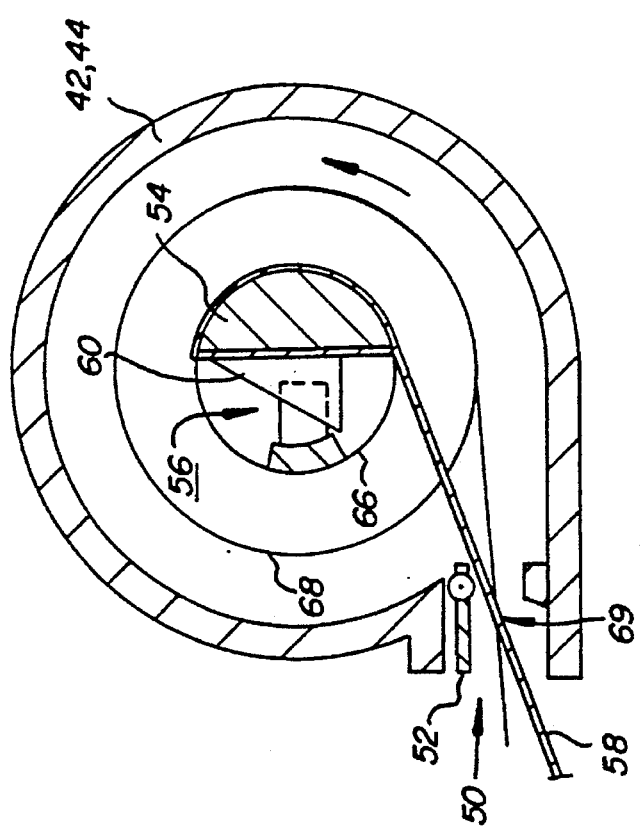
FIG. 3 shows a schematic, sectional view through the cartridge of FIG. 1, indicating path of the film strip to the smallest and largest diameters of a wound spool as winding progresses.

As shown in FIG. 3, after attachment end 60 has been attached to core 54, the spool is rotated in the direction indicated to wind length 58 through opening 50 onto the spool. As winding proceeds, the diameter of the wound roll on the spool grows from a minimum diameter 66 to a maximum diameter 68. Due to the narrowness of opening 50 and a desired rapid speed of winding, contact of length 58 with the peripheral edges or walls of opening 50 must be avoided, to prevent scratching the film. To prevent such contact, the direction of the path of the film through opening 50 during winding must be moved or adjusted between the illustrated tangential paths to wound rolls having diameters 66 and 68. According to one aspect of the invention, the path of the film is adjusted by pivoting or rotating a tangential plane of the film to the growing roll about a pivot axis 69 essentially centered in the area and depth of opening 50. For example, pivot axis 69 can be located by constructing a first tangential plane to diameter 66, which plane does not contact the edges or walls of opening 50; and a second tangential plane to diameter 68, which plane also makes no contact. The planes will intersect at pivot axis 69.

OVERALL ARRANGEMENT AND OPERATION OF THE APPARATUS

Figure 5:
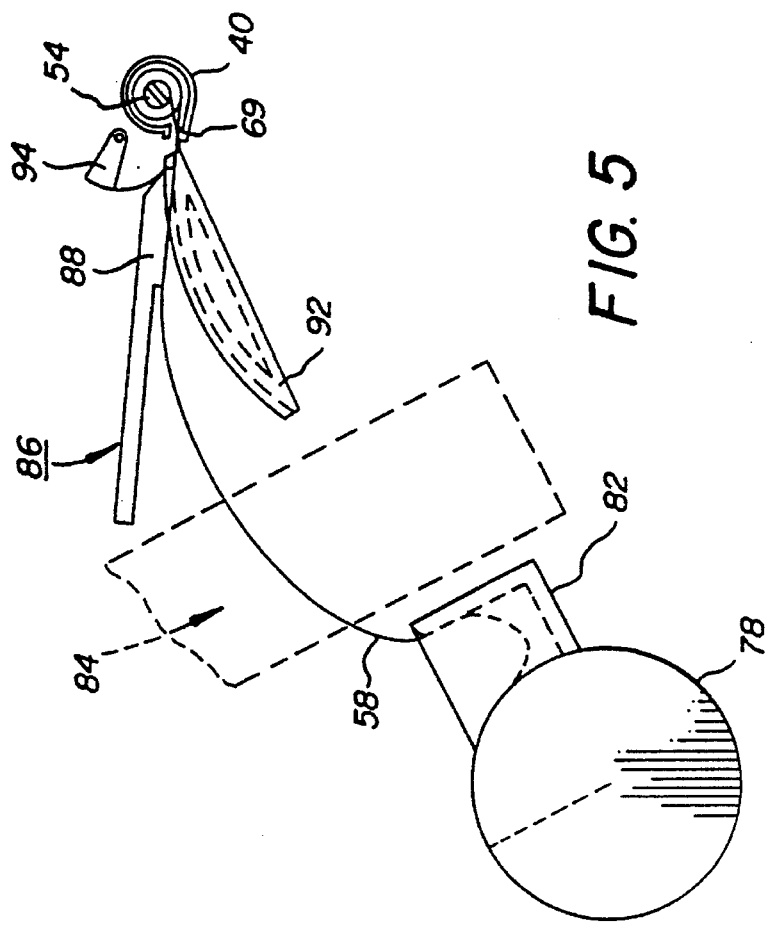
FIG. 5 shows a schematic view of the apparatus of FIG. 4, from a metering drum for the film, strip to the cartridge.

FIG. 4 shows an elevation view of the apparatus of the invention. A typically vertical face plate 70 supports a source 72 of an indeterminate length of web, such as photographic film, to be wound into a cartridge. A horizontal or angled face plate also could be used without departing from the invention. The web may or may not be provided with edge perforations. A fixed roller 74 is supported on the face plate to guide length 58 to a fixed, convex air bar 76 positioned adjacent a metering drum 78. If length 58 is provided with edge perforations, drum 78 may be a sprocket drum. Alternatively, if length 58 does not have edge perforations, drum 78 may be a conventional ported vacuum drum. A servomotor 80, visible in FIG. 27, is provided to rotate drum 78 as needed to meter length 58 to the remainder of the apparatus. Just downstream of drum 78, a small vacuum box 82, shown fragmentarily in FIG. 4 and schematically in FIG. 5, or a similar means, is provided for accumulating a short loop or portion of length 58 sufficiently long to permit insertion of attachment end 60 into cartridge 40 and engagement with spool 46, without rotation of drum 78, as will be discussed in detail subsequently.

Downstream of drum 78, a punch and die press 84 is supported on face plate 70, as shown in detail in FIGS. 14 to 21. Press 84 acts periodically on length 58 to cut the length and form attachment end 60 and openings 62, 64, 65 in each successive strip. Upstream of and above drum 78, a shuttle mechanism 86 is supported on the face plate, as shown in FIGS. 6 to 13 and 22 to 26. A vacuum head 88 on mechanism 86 is provided to grip each strip near attachment end 60 just as press 84 forms the attachment end. Press 84 and shuttle mechanism 86 are mechanically synchronized to enable vacuum head 88 to grip each successive strip, advance the strip between open, spaced platens of press 84 and present attachment end 60 to a winding station 90, shown in FIGS. 27 to 35. As the shuttle advances, drum 78 rotates to feed web slightly faster than the speed of the shuttle. As a result of this overspeed, vacuum box 82 accumulates the short loop or portion previously described. At winding station 90, a means or tool 94 is rotated to engage attachment end 60, at which point vacuum head 88 releases its grip and is withdrawn by the shuttle mechanism. Tool 94 then rotates to insert the end into the cartridge and attach the end to features 56 on core 54. While end 60 is being inserted and attached, drum 78 is stopped and the portion of length 58 accumulated in vacuum box 82 is withdrawn.

Vacuum box 82 also maintains tension on length 58 and compensates for any velocity mismatch between servomotor driven drum 78 and mechanically driven shuttle mechanism 86. Any such velocity mismatch could cause attachment end 60 to shift position on vacuum head 88, which could prevent engagement by tool 94. During movement of the shuttle mechanism and engagement of end 60 with the spool, this tension and velocity compensation help to prevent end 60 from disengaging from tool 94. And, tension transients from upstream of drum 78 are isolated by the drum from the downstream cutting and winding operations. Following attachment to the spool at winding station 90, each successive strip is wound almost completely into a cartridge 40. Vacuum box 82 is not active during the winding. During winding, an air bar 92 is pivoted about point 69 to adjust the path of the strip into cartridge 40. Winding then stoics to permit press 84 to cut the length again. Winding then recommences to draw the remainder of the strip into the cartridge. The loaded cartridge is then removed and replaced with an empty one. The process repeats.

Shuttle Mechanism 86

Figure 6:
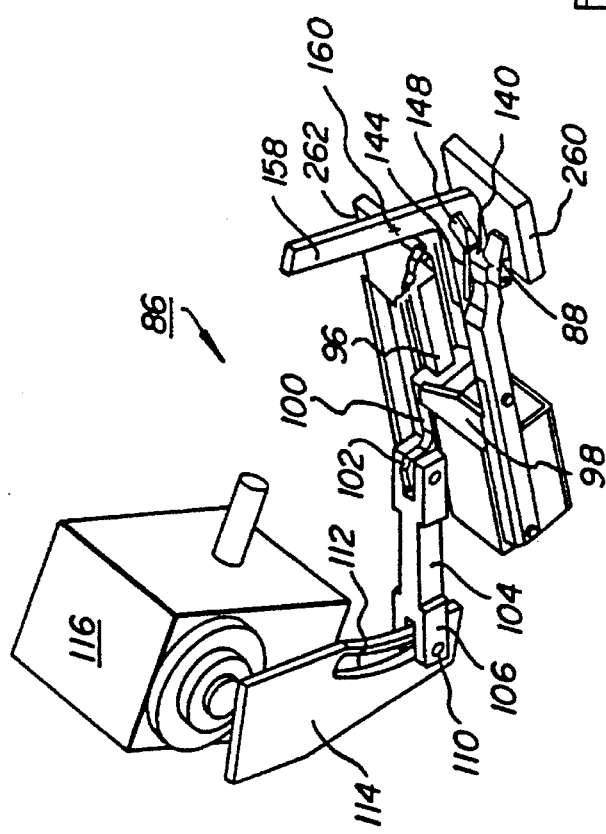
FIG. 6 shows a simplified, perspective view of the shuttle mechanism of the invention.
Figure 7:
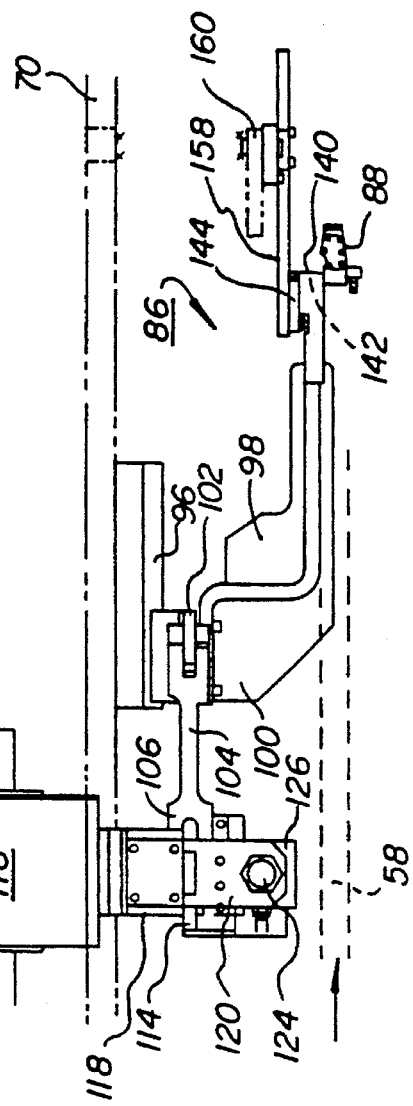
FIG. 7 shows a plan view of the shuttle mechanism, taken along line 7—7 of FIG. 4, with the punch and die press omitted for ease of illustration.
Figure 9:
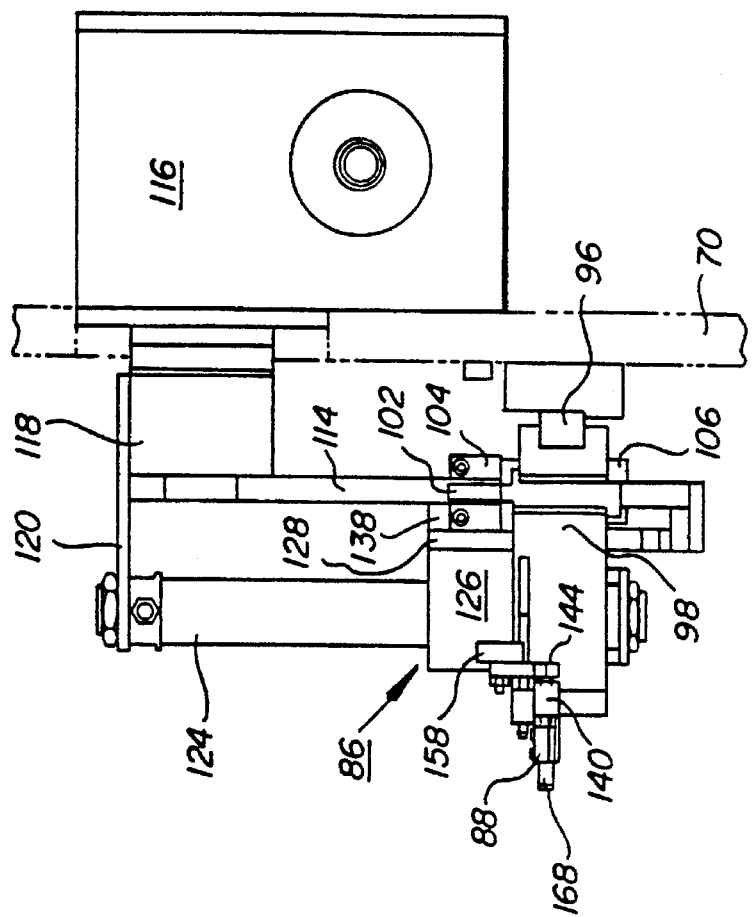
FIG. 9 shows an elevation view of the shuttle mechanism, taken along line 9—9 of FIG. 4, with the punch and die press omitted for ease of illustration.
Figure 10:
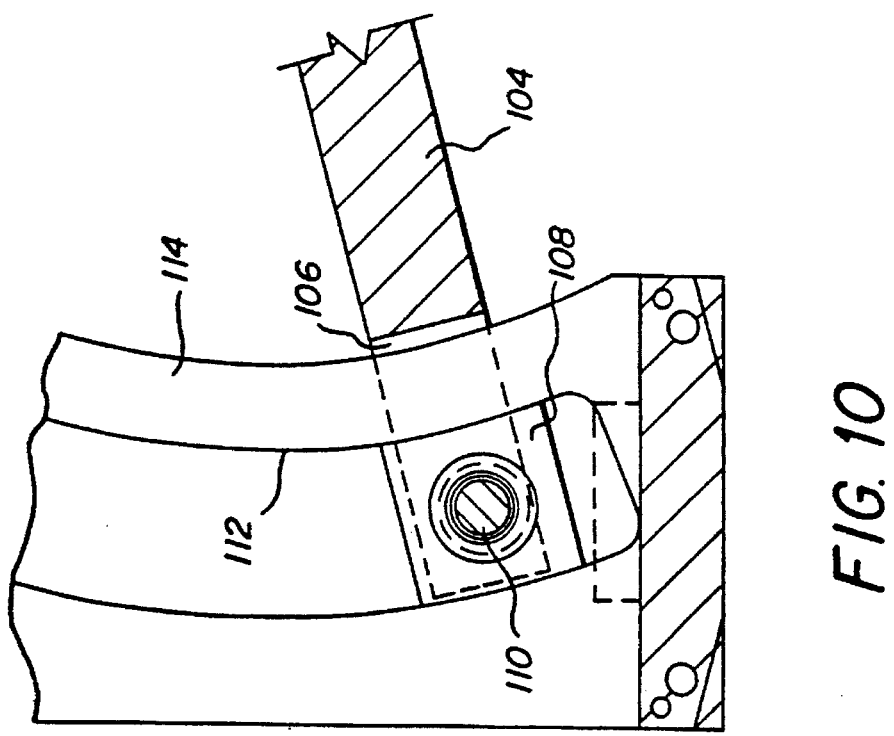
FIG. 10 shows a fragmentary sectional view, taken along line 10—10 of FIG. 8.

Referring to FIGS. 4 and 7 to 11, the shuttle mechanism of the invention may be understood to comprise a means for gripping a length of web near an end to be attached to a spool and for moving the attachment end toward an opening in a cartridge. FIG. 6 illustrates a moderately different arrangement from the other figures, which functions in the same manner, however. As shown in FIG. 7, a linear slide 96 is mounted to face plate 70 and supports an essentially Z-shaped shuttle arm 98 having a driven end 100. An upwardly extended flange 102 at end 100 is pivotably connected to one end of a drive link 104 having an opposite, clevis end 106 which pivotably supports a cam follower 108 on a pivot pin 110, as shown in FIG. 10. Cam follower 108 rides in an arcuate cam slot 112 provided in a actuator arm 114 which is operatively connected to a conventional oscillating drive 116 mounted to the back side of face plate 70. An adapter block 118 spaces actuator arm 114 in front of face plate 70.

Figure 8:
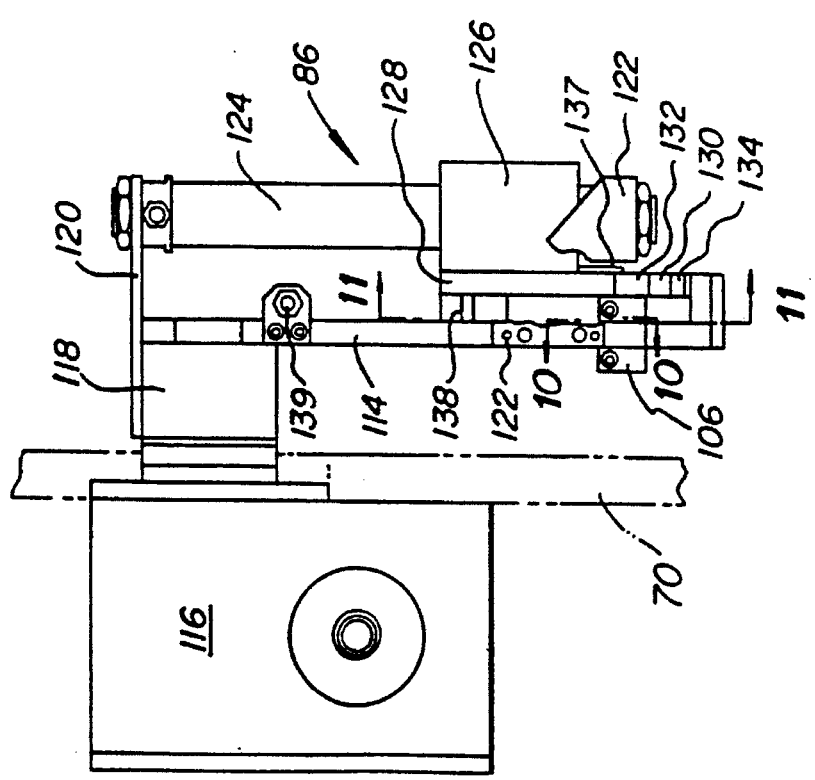
FIG. 8 shows an elevation view of the shuttle mechanism, taken along line 8—8 of FIG. 4.
Figure 11:
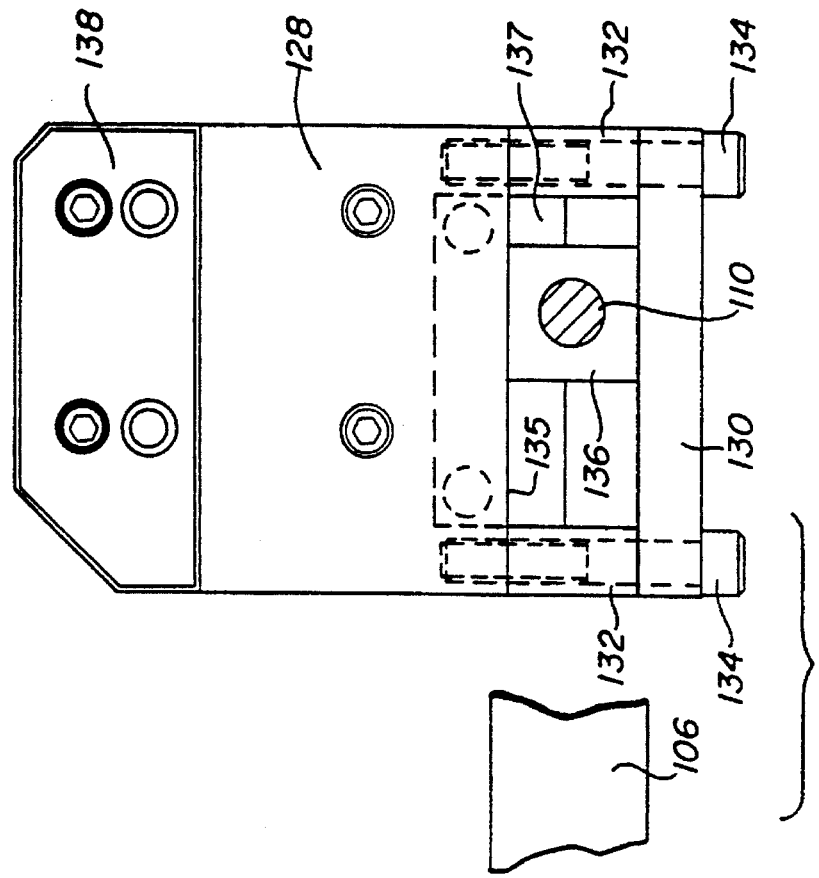
FIG. 11 shows a fragmentary sectional view, taken along line 11—11 of FIG. 8.

As seen in FIGS. 8 and 9, an upper cylinder mount 120 and a lower cylinder mount 122 are attached to opposite ends of the actuator arm and support between them a conventional pneumatically actuated, magnetically coupled, rodless cylinder 124, or similar adjustable length actuator. An output member 126 of cylinder 124 is operatively connected to a downwardly extended support plate 128, shown in FIGS. 8 and 11. Below plate 128, a clamp bar 130 is positioned by a pair of spacers 132 and held by a pair of bolts 134. Between the lower edge 135 of support plate 128 and clamp bar 130 is mounted a slider 136 supported on an extension of pin 110. A keeper plate 137 is mounted to a front surface of support plate 128 to retain slider 136, as shown in FIGS. 4 and 11. A bearing pad 138 is attached to an upper end of support plate 128 to slide against actuator arm 114 upon actuation of cylinder 124. A proximity detector 139 is supported on arm 114 to detect movement of output member 126 to an upper limit of its travel.

During normal operation of the shuttle mechanism, cylinder 124 holds support plate 128 toward the bottom end of cam slot 112. In instances where the travel of the shuttle needs to be shortened to permit rejection of a defective strip, as will be described subsequently, cylinder 124 is actuated by a suitable electric solenoid valve, not illustrated, to raise the support plate toward the position illustrated in dashed lines in FIG. 4. As cam follower 108 moves along cam slot 112, the effective length of actuator arm 114 is shortened, thereby shortening the travel of the shuttle. At the same time, slider 136 moves transversely between clamp bar 130 and edge 135.

Figure 12:
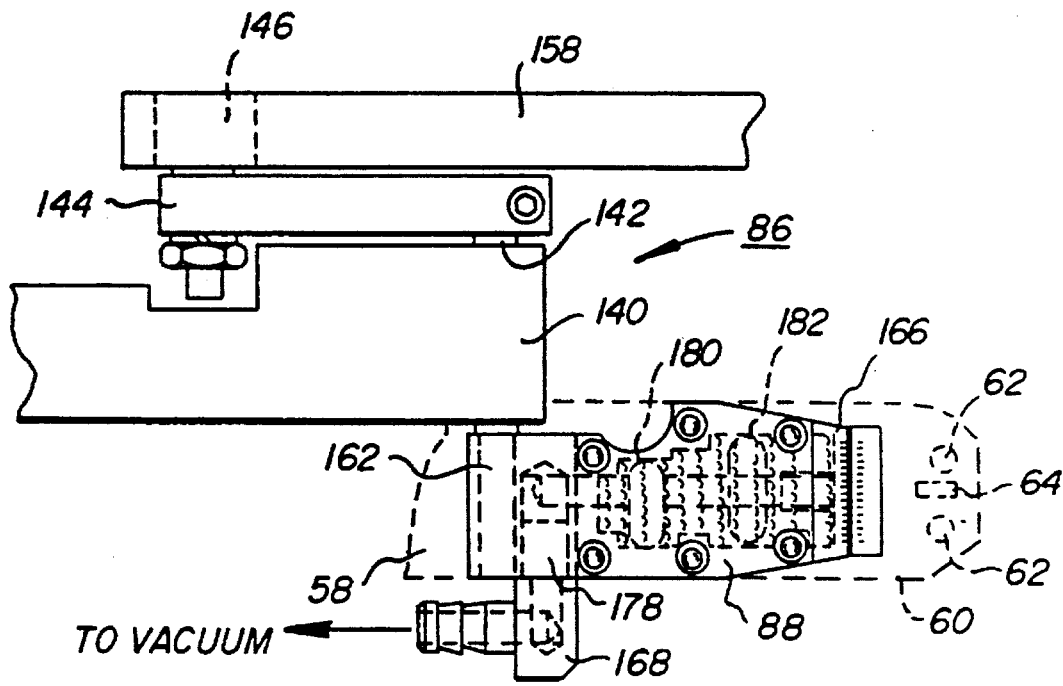
FIG. 12 shows an enlarged plan view of the vacuum head and actuating mechanism of tile shuttle mechanism.
Figure 13:
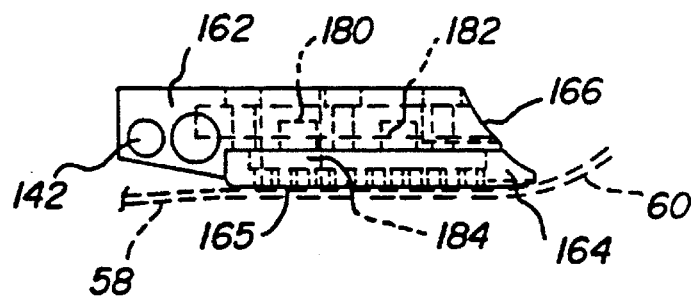
FIG. 13 shows an enlarged elevation view of the vacuum head.

As shown in FIGS. 7, 12 and 13, opposite drive end 100, shuttle arm 98 includes a pick-up end 140 which rotatably supports a transverse pivot shaft 142. On an outboard end of shaft 142, vacuum head 88 is fixedly mounted. An opposite, inboard end of shaft 142 fixedly supports a cam follower link 144 which carries a cam follower 146, shown in dashed lines in FIG. 12. Follower 146 rides in an elongated dipper cam slot 148, as shown in FIGS. 4 and 22 to 26, slot 148 being formed in a dipper cam link 158 pivotably mounted at 160 to face plate 70. The function of the dipper cam will be described subsequently.

Vacuum head 88 comprises a plate-like housing 162 and an orifice plate 164 attached to the housing. A curved end surface 166 is provided to permit passage of tool 94 when attachment end 60 is engaged. A pneumatic fitting 168 is attached to housing 162 and communicates with a suitable vacuum source, not illustrated. Within the housing, fitting 168 communicates with an L-shaped internal passage 178, which opens into a pair of transverse plenums 180, 182 formed in an under side of the housing. Plenums 180, 182 open into a plenum 184 formed in an upper side of orifice plate 164. A plurality of orifices 165 extend through plate 164 in the familiar manner to enable the head to grip length 58. The under surface of orifice plate 164 curves upwardly at the tip of the vacuum head, to cause attachment end 60 to curve upwardly for engagement by tool 94, as shown in dashed lines in FIG. 13.

Punch and Die Press 84

Figure 14:
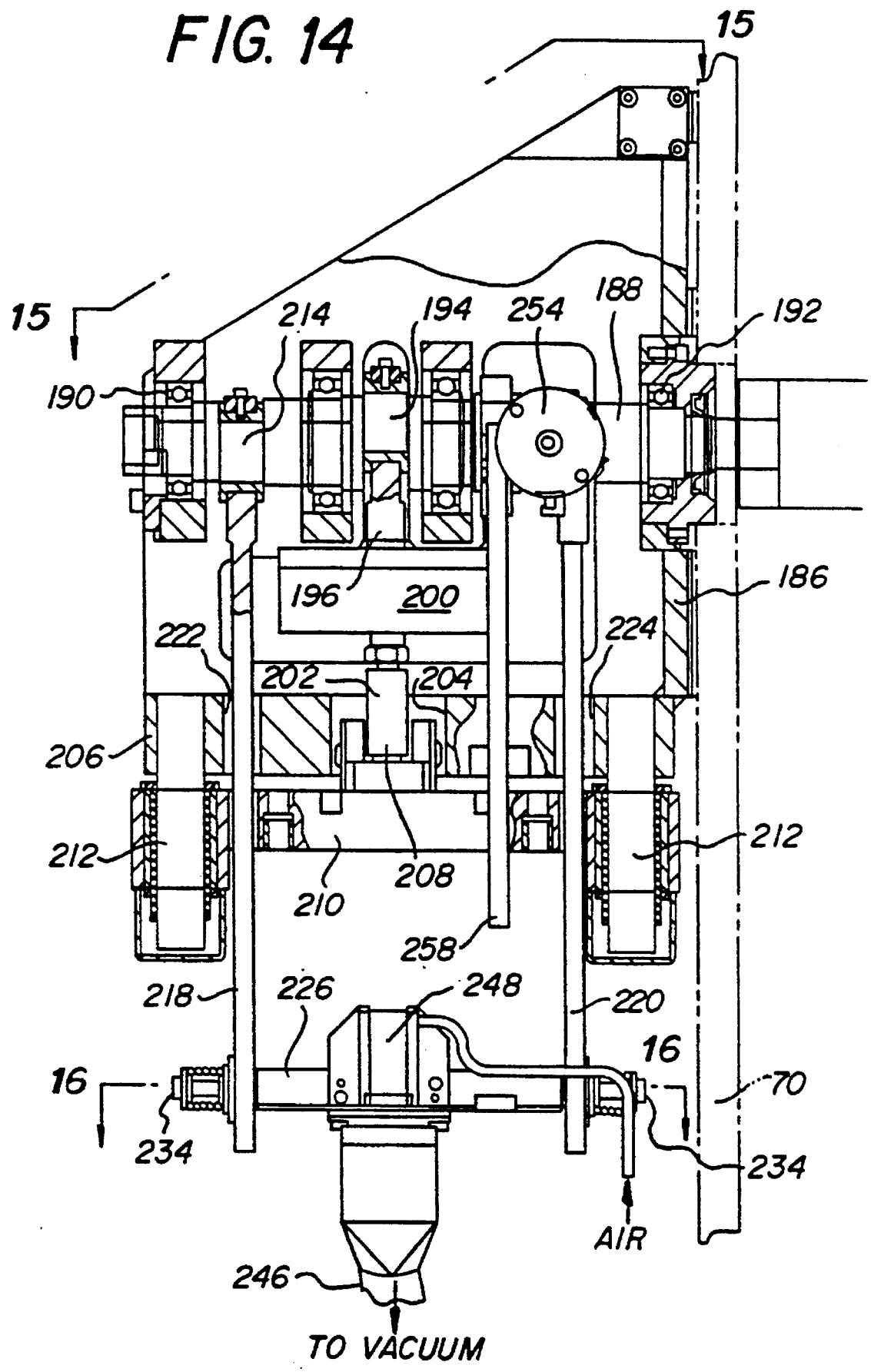
FIG. 14 shows an elevation view, partially in section, of the punch and die press of the invention, taken along line 14—14 of FIG. 4, with the winding station omitted for ease of illustration.
Figure 19:
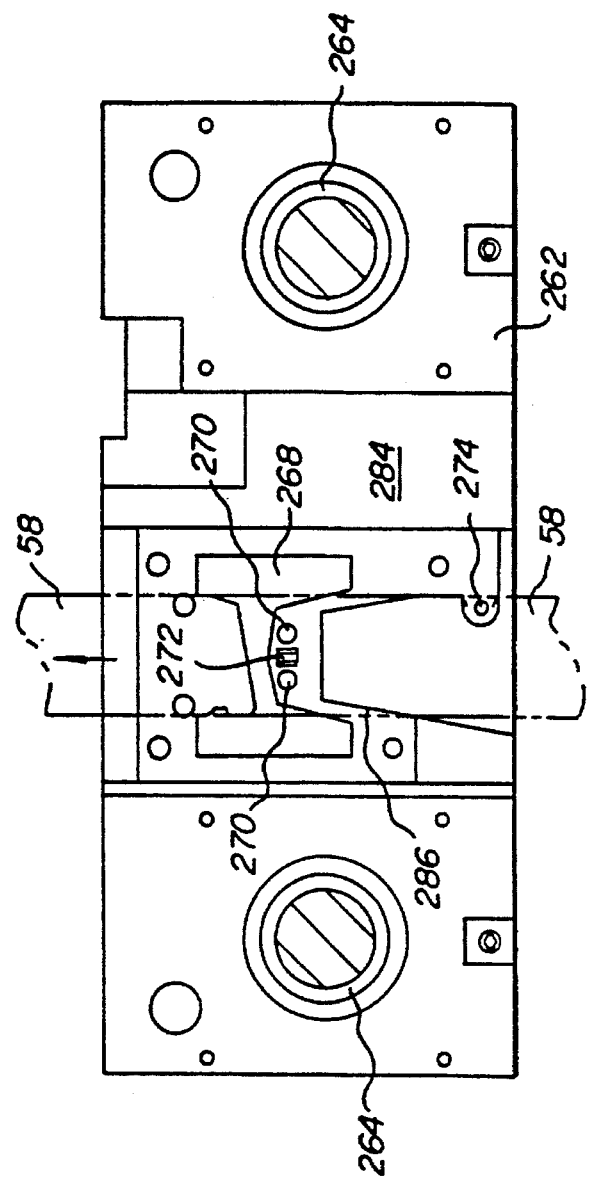
FIG. 19 shows a view of the punches in the punch and die set, taken along line 19—19 of FIG. 17.
Figure 18:
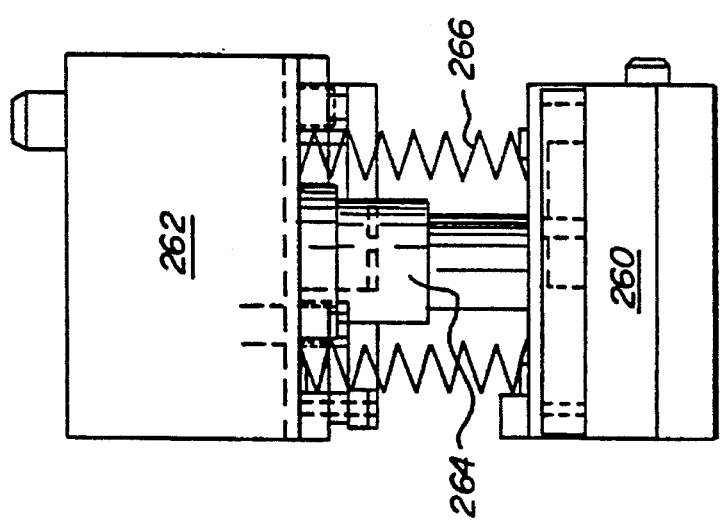
FIG. 18 shows a side elevation view of tile punch and die set, as seen from the right of FIG. 17.

As shown in FIGS. 14 and 15, punch and die press 84 includes a fabricated box frame 186. As shown in FIG. 4, press 84 is mounted to face plate 70 between drum 78 and winding station 90. Near its upper end, frame 186 rotatably supports a four-throw crank 188 on a pair of end bearings 190, 192. An outboard, central throw 194 pivotably supports an adjustable length crank arm 196 comprising an integrally connected, adjustable length, normally fully extended actuator 200, such as a pancake pneumatic cylinder, which can be retracted by operating a suitable electrical solenoid valve, not illustrated, to inhibit operation of the press. The lower end 202 of arm 196 extends through a passage 204 in a bottom wall 206 of frame 186 and is connected by a pivot joint 208 to an upper press platen 210. A pair of linear ball bushings or similar guides 212 are mounted to the under side of wall 206 and cooperate in the familiar manner with the upper press platen to guide its movement. An outboard throw 214 and an inboard throw 216 pivotably support respective crank arms 218, 220 which extend through respective passages 222, 224 in wall 206 to pivotably support a lower press platen 226. A punch and die set, shown separately in FIGS. 17 to 19, is mounted between the press platens during operation, to provide a complete means for cutting the film.

A stable pivot joint is ensured between crank arms 218, 220 and platen 226 by the mounting arrangement shown in FIG. 16. The crank arms support the outer races of tapered roller bearings 228, whose inner races are supported on stub shafts 230 extended from the lower press platen. A cone clamping ring 232 engages the inner race of each bearing and is held in place by a clamping bolt 234. An outside collar 236 is engaged by the head of bolt 234. A compression spring 238 is captured between collar 236 and an inside collar 240 which is held within a bearing clamp ring 242. This arrangement effectively eliminates radial play in the pivot joints.

Lower press platen 226 includes a central opening 244 for removal of scrap material. A vacuum chute 246 communicates with the under side of platen 226 to carry away such scrap. On its downstream edge close to winding station 90, platen 226 supports a rejected strip removal chute 248 which also is connected to vacuum chute 246. As indicated schematically in FIGS. 22 to 24, chute 248 curves downwardly to intersect with chute 246. Chute 248 may be provided with an air track surface, not illustrated, to convey rejected strips toward chute 246. A suitable air track is shown in commonly assigned U.S. Pat. No. 5,209,387, which is incorporated by reference into this specification. Of course, a vacuum tube, nip rollers or other similar devices also could be used rather than an air track.

An inboard, central throw 250 pivotably supports an adjustable length crank arm 252 comprising an integrally connected, adjustable length actuator 254, such as a pneumatic cylinder. As shown in FIGS. 4 and 15, a rod end 256 of actuator 254 is pivotably connected to a downwardly extended link 258 which is rigidly connected to dipper cam link 158. Thus, rotation of crank 188 will cause dipper cam link 158 to rotate about pivot 160, for a purpose to be described subsequently. Actuator 254 and actuator 124 preferably are actuated by a single solenoid valve, not illustrated. A proximity detector 259, shown schematically in FIG. 4, may be provided to detect movement of rod end 256 to its extended position.

Punch and Die Set

Mounted between platens 210, 226 is a punch and die set shown separately in FIGS. 17 to 19. Those skilled in the art will appreciate that cooperating knives could be mounted on the platens, rather than punches and dies, without departing from our invention. A lower die shoe 260 is bolted to an upper surface of lower press platen 226 and an upper die shoe 262 is bolted to an under surface of upper press platen 210. A pair of linear ball bushings or similar guides 264 are mounted to the lower die shoe and cooperate with the upper die shoe to guide its movement. A pair of bellows 266 surround the guides. As shown in FIGS. 17 and 19, a roughly H-shaped punch 268 is mounted to the underside of the upper die shoe to cut length 58 transversely, while punching out the geometry of attachment end 60 and also the geometry of the trailing end of the preceding strip. A pair of cylindrical punches 270 are provided to punch out holes 62; an oblong punch 272, to punch out hole 64; and a cylindrical punch 274, to punch out hole 65. Beneath the punches, a die plate 276 is provided in the familiar manner with cooperating, precisely geometrically congruent die openings, not illustrated. Suspended beneath the dies is a stripper plate 278 having congruent openings for passage of the dies. Compression springs 280 permit the stripper plate to retract upward when the die set is closed. A slot 284 is provided through upper die shoe 262 for passage of dipper cam link 158. Finally, a pocket 286 is provided in the upper die shoe and stripper plate, just upstream of die 268, to accommodate vacuum head 88 when the die set is closed.

Synchronized Drive for Shuttle Mechanism 82, Die Press 84 and Winding Station 90

Figure 20:
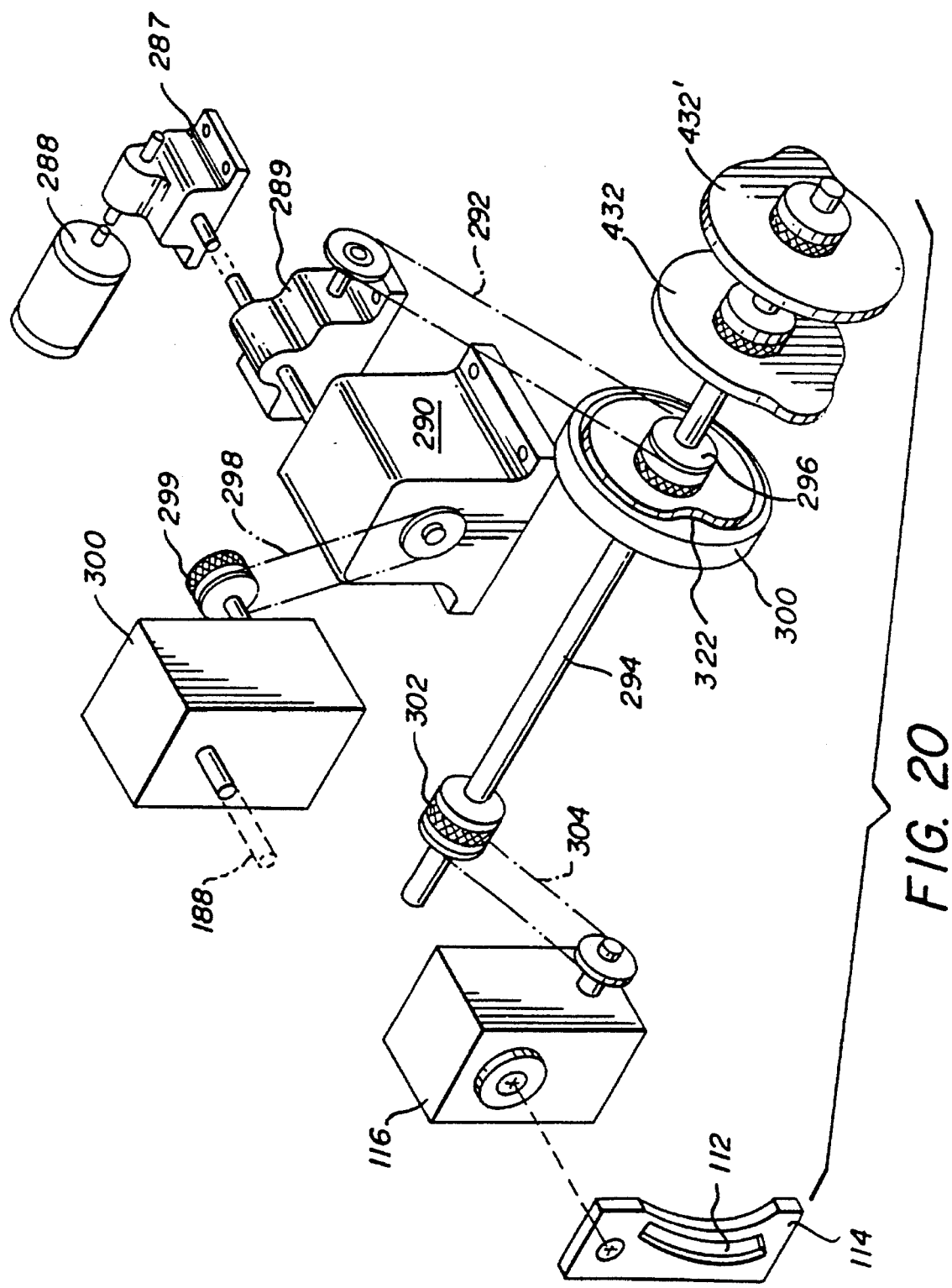
FIG. 20 shows a schematic, perspective view of a drive system for the shuttle mechanism, die press and winding station of the invention.

FIG. 20 illustrates schematically a drive system for synchronously operating the shuttle mechanism, die press and winding station. A motor 288 drives a right angle reducer 287 which drives a right angle reducer 289 which drives a reducer 290, the reducers being mounted at the back side of face plate 70. A chain or timing belt 292 extends from reducer 289 to a main line shaft 294, which also drives components of winding station 90. A conventional phase adjuster 296 permits adjustment of the relative angular positions of the components connected by chain 292. A chain or timing belt 298 extends from reducer 290 to a conventional intermittent drive 300 which is operatively connected to crank 188 of die press 84. A phase adjuster 299 permits adjustment of the relative angular positions of reducer 290 and drive 300. A phase adjuster 302 connects line shaft 294 with a chain or timing belt 304 to oscillating drive 116.

Figure 21A:
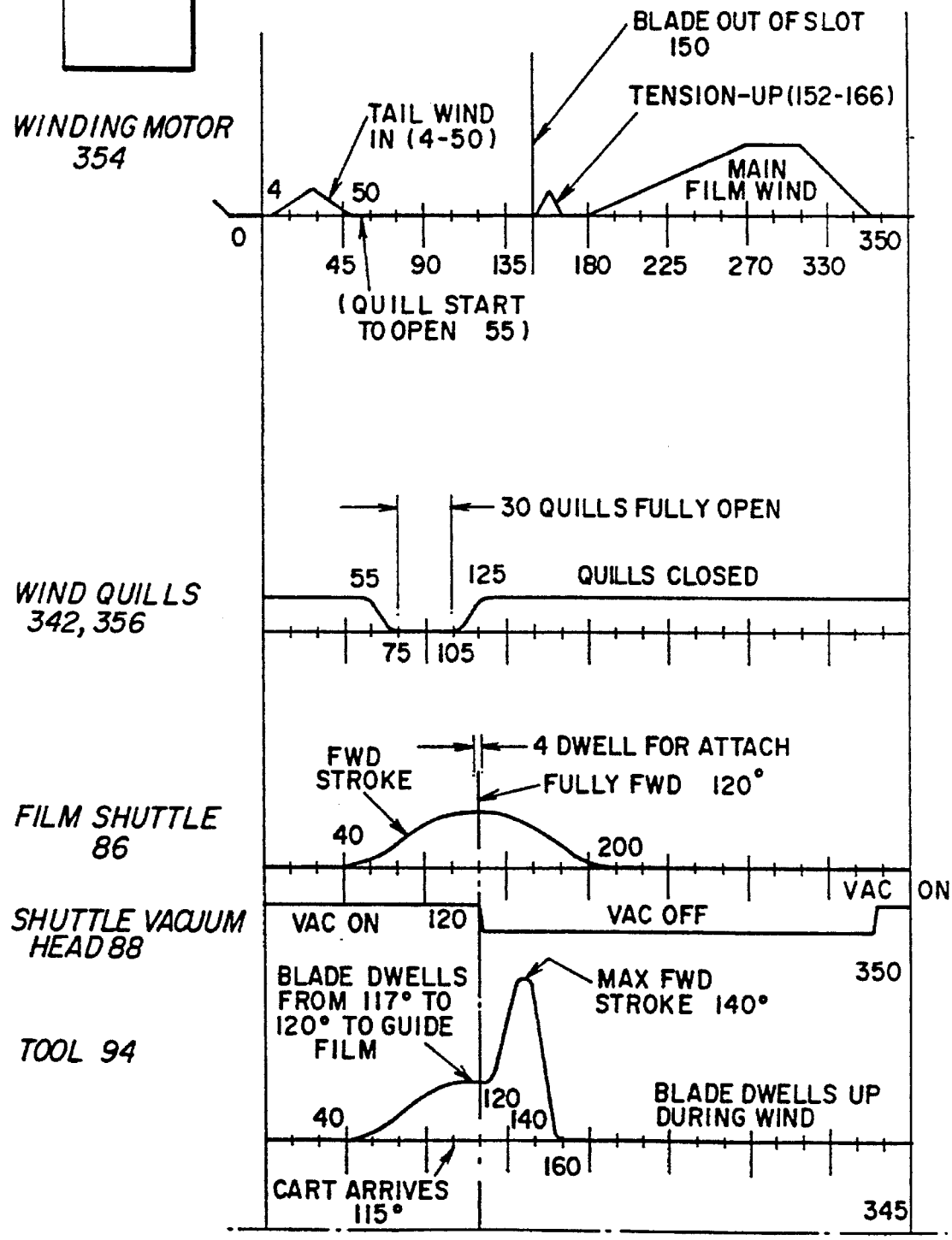
FIG. 21 shows a timing diagram for operation of system of FIG. 20.
Figure 21B:
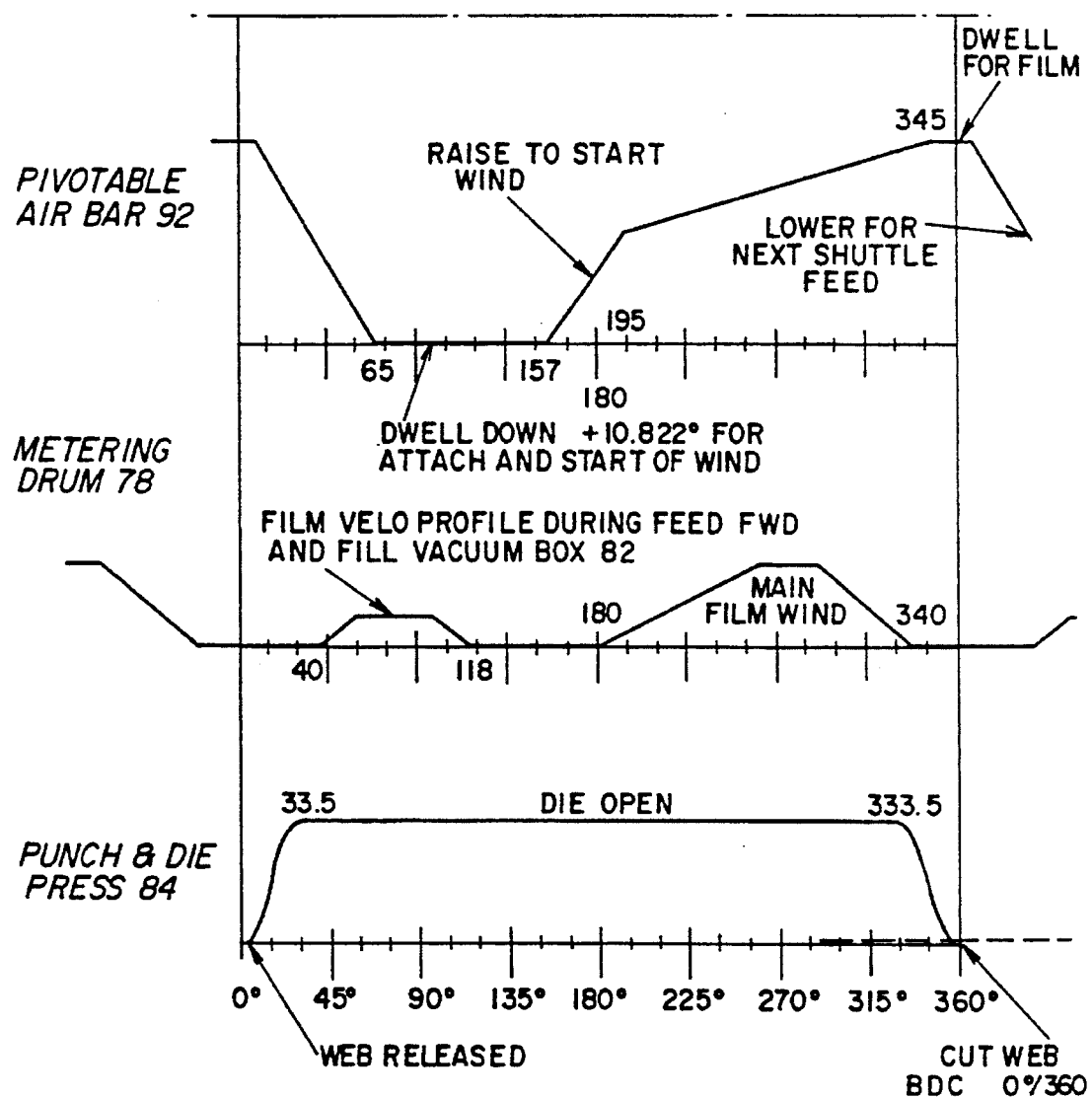
Figure 22:
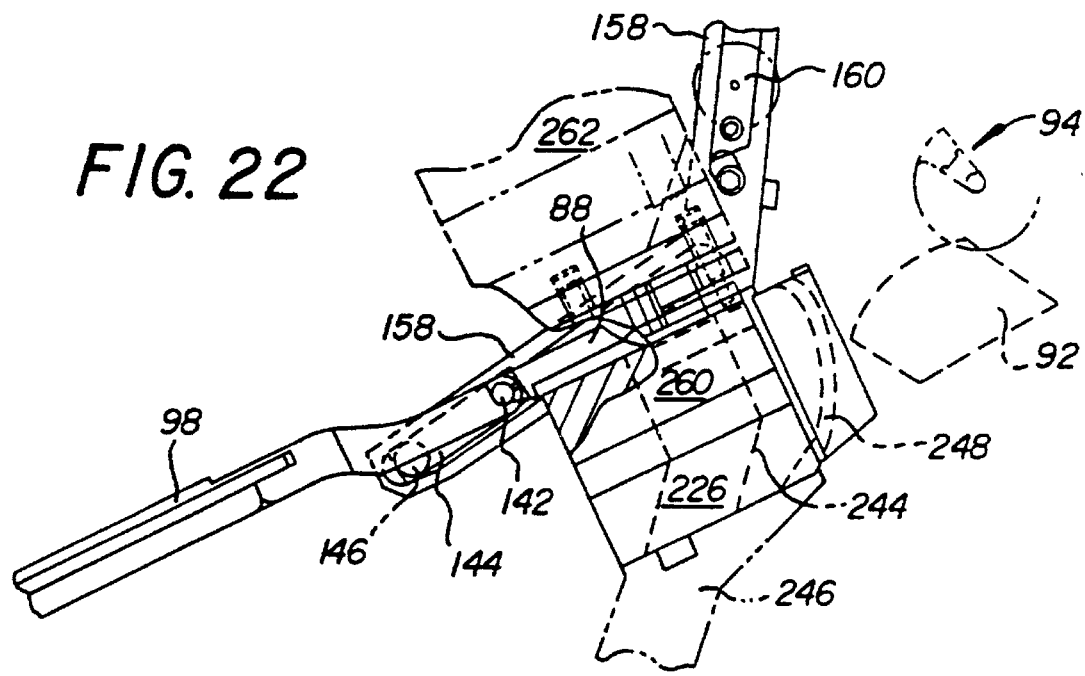
FIG. 22 shows a fragmentary elevation view of the shuttle mechanism with the vacuum head engaging the film strip at the punch and die set, just as the film strip is cut.
Figure 23:
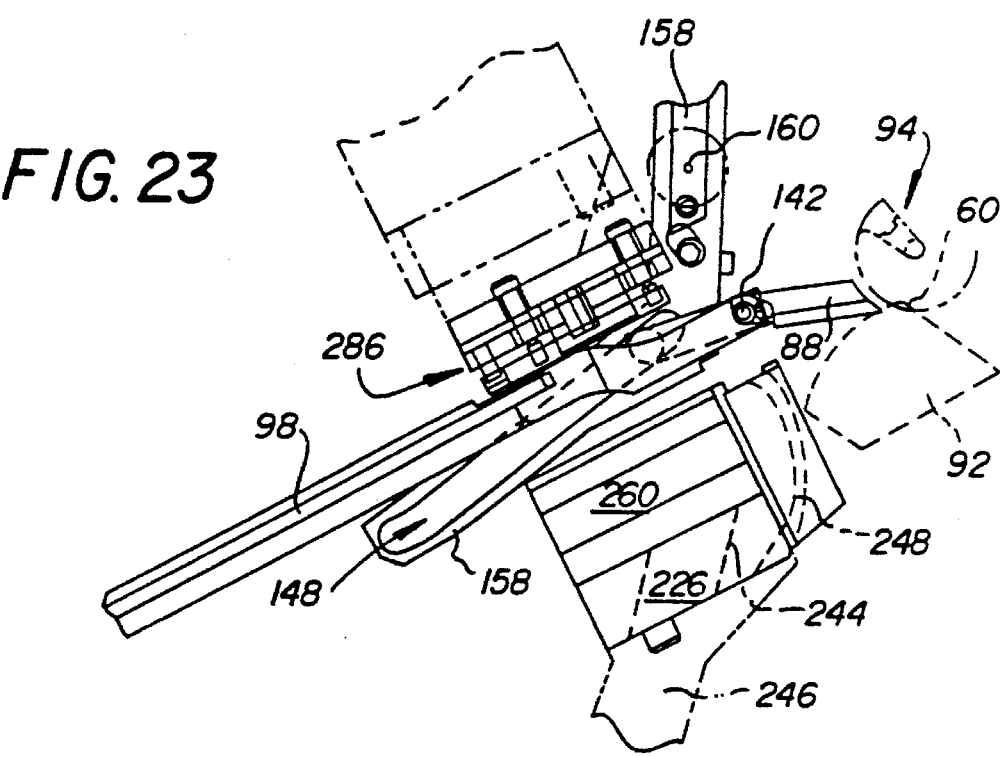
FIG. 23 shows a fragmentary elevation view of the shuttle mechanism with the vacuum head extended between the punch and die, to permit the film strip to be engaged, inserted into the cartridge and attached to the spool.

FIG. 21 illustrates the timing of operation of the major components of the apparatus of the invention. As crank 188 rotates, the die press shuts and the dipper cam is moved downward to lower the vacuum head into position between the die shoes. The vacuum to head 88 is turned on as the shuttle is located within pocket 286 of the closing die set, as shown in FIG. 22. At bottom dead center of throw 194 of the die press, length 58 is cut and attachment end 60 is gripped by vacuum head 88. The die press then opens and the shuttle advances between the punches and dies. As the shuttle moves, vacuum head 88 is raised by the dipper cam to present attachment end 60 in the proper orientation for engagement by tool 94 at the winding station, as shown in FIG. 23. There, drive 116 dwells briefly while the attachment end is engaged by tool 94. Then the vacuum is turned off and the shuttle is retracted to dwell in the position of FIG. 24 until the cycle repeats.

Removal of Defective Strips

FIGS. 25 and 26 illustrate how a defective strip can be removed using chute 248. Such a defective strip may be formed, for example, when the apparatus is initially threaded up or when a splice has been made between successive stock rolls of length 58. To remove such a strip, cylinder 124 is actuated to shorten the travel of the shuttle mechanism, so that vacuum head 88 will stop just above chute 248, as shown in FIG. 25. Simultaneously, cylinder 254 is actuated to extend its rod and pivot dipper cam link 158 to the position of FIG. 26. Rather than the two-step process suggested by Figures 25 and 26, the simultaneous actuation of cylinders 124 and 254 causes vacuum head 88 to dip downward as the shuttle is moving between the die shoes; so that, when the shuttle reaches the end its shortened travel, the vacuum head is in position above chute 248 with attachment end 60 extended into the chute. Line shaft 294 is stopped. The air track within chute 248 is then activated, vacuum to head 88 is shut off and drum 78 is rotated until the defective portion has moved into the chute. Cylinders 124 and 254 are retracted; the shuttle is withdrawn to the position of FIG. 24. The defective strip is then cut by press 84. Line shaft 294 starts again and operation continues for the next strip.

Winding Station 90

FIGS. 4 and 27 to 35 show the details of the winding station of the invention. A disk cam 320, shown fragmentarily in FIG. 27, is mounted for rotation with line shaft 294. Cam 320 includes a circumferential cam slot 322. A mounting bracket 324 extends from the back surface of face plate 70 and pivotably supports a drive link 326 on a pivot shaft 328. A lower end of link 326 is pivotally connected to a shaft block 330 which is non-rotatably mounted on an inboard end of an inboard quill shaft 332. A cam follower 334, shown in dashed lines in FIG. 27, extends laterally from shaft block 330 and rides in cam slot 322. As a result, rotation of cam 320 will cause quill shaft 332 to move horizontally while supported by a linear ball bushing 336 mounted on the back surface of the face plate and a linear ball bushing 338 mounted on the front surface of the face plate. A cylindrical housing 340 surrounds and supports bushing 338. A rotatable, inboard quill head 342 is mounted on an outboard end 344 of quill shaft 332 to engage and rotate with one end of spool 48 of cartridge 40.

At an upper end of link 326, an actuator link 346 is pivotably connected. An opposite end of link 346 is pivotably connected to a spline shaft 348 mounted for movement in a linear ball bushing 350 supported on the front surface of the face plate. Depending from an outboard end of spline shaft 348 is a motor support arm 352 on which is mounted a winding motor 354 or similar means for rotating the spool to draw the film strip into the cartridge. In one embodiment of the invention, motor 354 was of the type disclosed in commonly assigned U.S. Pat. Nos. 4,914,390 and 4,942,343, which are hereby incorporated by reference into this specification. Motor 354 drives an outboard quill shaft 356 to engage and rotate spool 48. Thus, rotation of cam 320 will cause the inboard and outboard quill shafts to move toward and engage the spool of a cartridge 40. Those skilled in the art will appreciate that the profile of cam plate 322 is determined by the time required to place an empty cartridge, complete winding and remove a loaded cartridge. Prior to advancing the quill shafts, the cartridge may be positioned between the ends of the shafts by any convenient pick and place mechanism, such as that disclosed in commonly assigned, copending U.S. Ser. No. 08/405,315 filed on 16 March 1995 by our colleague Stephen M. Reinke now U.S. Pat No. 5,549,441.

As shown in FIG. 27A, means are provided for preventing the shell of cartridge 40 from rotating during rotation of the quill shafts. Motor 354 includes a housing 360 having an annular front cover 362 with a central bore 364, through which quill shaft 356 extends. An anti-rotation pin 368 is extended axially from cover 362 in position to engage bore 51 of the cartridge (See FIG. 1) when motor 354 is advanced to engage the quill shaft with the spool. A retainer clip 370 holds pin 368 in place and simplifies pin replacement. A similar anti-rotation pin, not illustrated, may be provided to engage bore 51 on the other side of the cartridge.

FIG. 21 shows the sequence of a winding cycle. Once attachment end 60 has been attached by tool 94 and the tool has withdrawn from the cartridge, motor 354 is rotated for several degrees to apply tension and ensure proper attachment to the spool. Motor 354 and metering drum 78 are then rotated to complete the main portion of the wind and then stop briefly to allow press 84 to cut the web. Web 58 may be provided with a notch or perforation, not illustrated, which may be detected in the familiar manner to indicate when the main portion of the wind should be stopped to allow the press to operate. The remaining portion, or tail, of the web is then wound into the cartridge. After motor 354 has wound a strip of film into the cartridge, continued rotation of cam 320 will cause the quill shafts to retract to permit removal of just loaded cartridge and insertion of an empty cartridge.

Rotatable Air Bar 92

Figure 29:
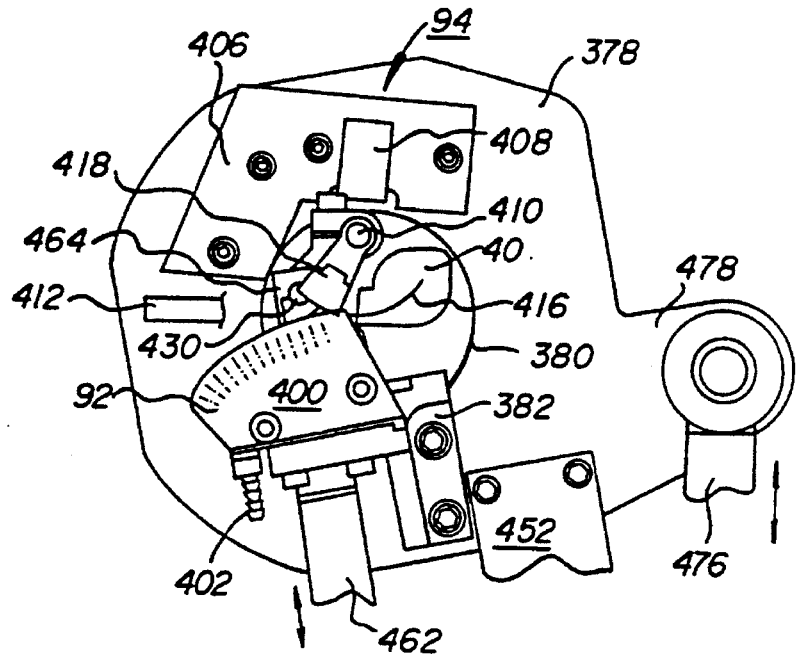
FIG. 29 shows an elevation view as in FIG. 28, just as the film strip is attached to the core of the spool within a cartridge.
Figure 30:
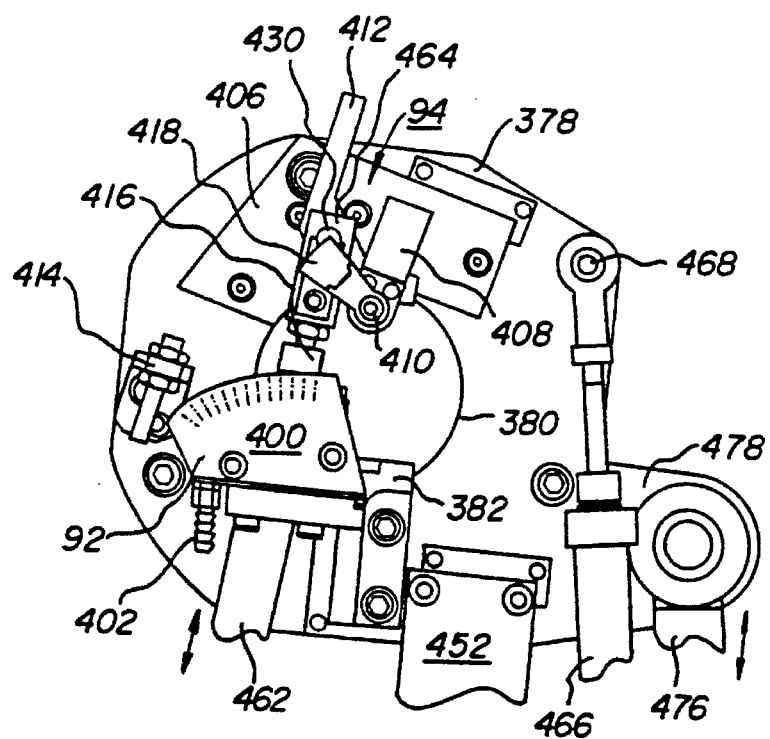
FIG. 30 shows an elevation view as in FIG. 28, after the film strip has been wound into the cartridge and the rotate plate has been rotated during winding to prevent contact between the strip and an axial opening into the cartridge.

To ensure that the film does not scrape on the edges or walls of opening 50, means are provided for adjusting the path of the film through the opening as winding proceeds. As seen in FIG. 27, a pair of bearings 374 are mounted on a cylindrical external surface of housing 340. When a cartridge 40 is positioned between the quill shafts, the axis of rotation of bearings 374 is coincident with point 69 on the path of the film into the cartridge. A hollow cylinder 376 is mounted for rotation on bearings 374. A rotate plate 376, best seen in FIGS. 28 to 30, is attached to an outboard end of cylinder 376 and provided with a central hole 380 for passage of inboard quill shaft 332.

Figure 31:
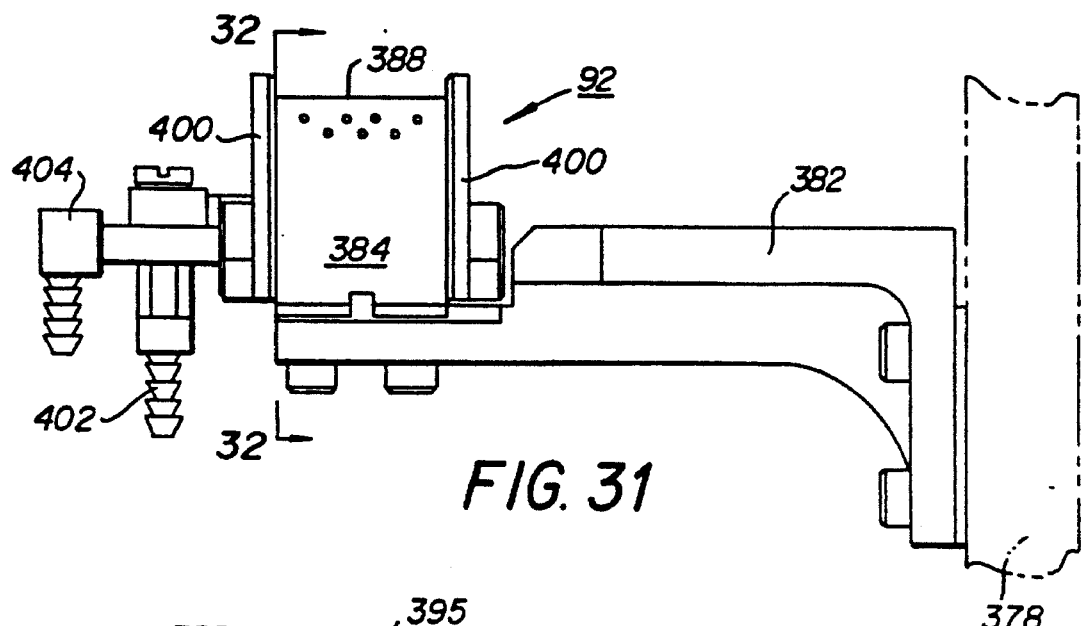
FIG. 31 shows a side elevation view of the rotatable air bar used to adjust the path of the film strip into the cartridge.
Figure 32:
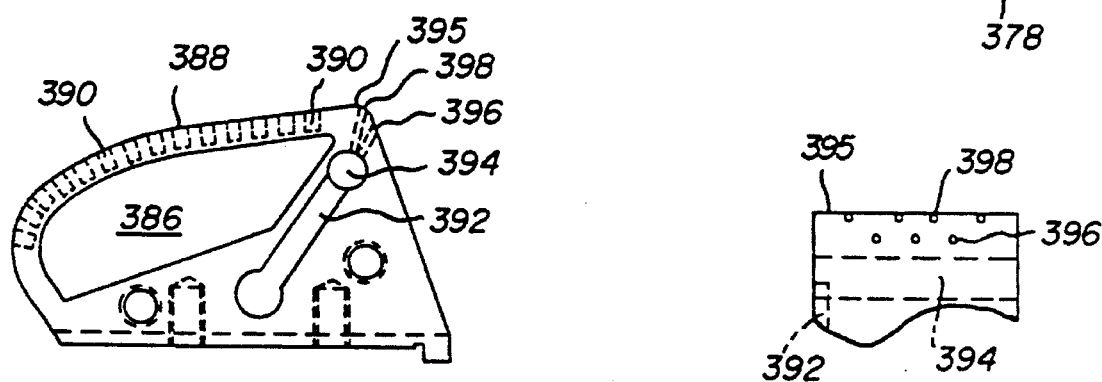
FIG. 32 shows a view of the air bar, taken along line 32—32 of FIG. 31.
Figure 33:
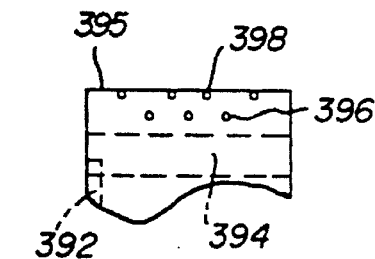
FIG. 33 shows a fragmentary view of the downstream lip of the air bar, from the right as viewed in FIG. 32.

As seen in FIG. 31, a mounting bracket 382 extends axially from the rotate plate to support pivotable air bar 92. A stationary air bar, such as that disclosed in commonly assigned U.S. Pat. No. 4,903,907, would not be suitable for this application since that known air bar was configured for use with a spool not yet enclosed in a cartridge. As shown in FIG. 32, air bar 92 comprises a body portion 384 within which is formed an air plenum 386. A smooth, convex external surface 388 is provided on body 384 to face the moving film. Air from plenum 386 flows outwardly toward the film through a plurality of holes 390, thereby supporting the moving web on a film of air in the familiar manner. Means are provided for directing a flow of air at attachment end 60, to deflect the attachment end upward to a position for engagement by tool 94; and for directing a flow of air at door 52 to hold the door against accidental movement into the path of tool 94. An internal passage 392 within body portion 384, separate from plenum 386, communicates with a cross or transverse bore 394 near a downstream edge or lip 395 of surface 388. A transverse row of holes 396 extends from bore 394, the holes being aimed to direct streams of air toward an adjacent cartridge 40 to push door 52 upward away from opening 50. This is done even though the cartridge is presented for loading with its door already open, simply to minimize chances of contacting the door with tool 94. A second transverse row of holes 398, upstream of holes 396, extends from bore 394, these holes being aimed to direct streams of air toward attachment end 60 of strip 58, when vacuum head 88 presents attachment end 60 of the film in the position of FIG. 23. This is done to curl the attachment end upwardly to facilitate engagement by tool 94. A pair of side plates 400 are attached to either side of body portion 384 and extend beyond surface 388 to provide lateral guidance for the film. A pneumatic fitting 402 communicates with plenum 386 to provide air for the air bar. Similarly, a pneumatic fitting 404 communicates with passage 392 to provide air for holes 396, 398.

Engaging, Inserting and Attaching Tool 94

Figure 35:
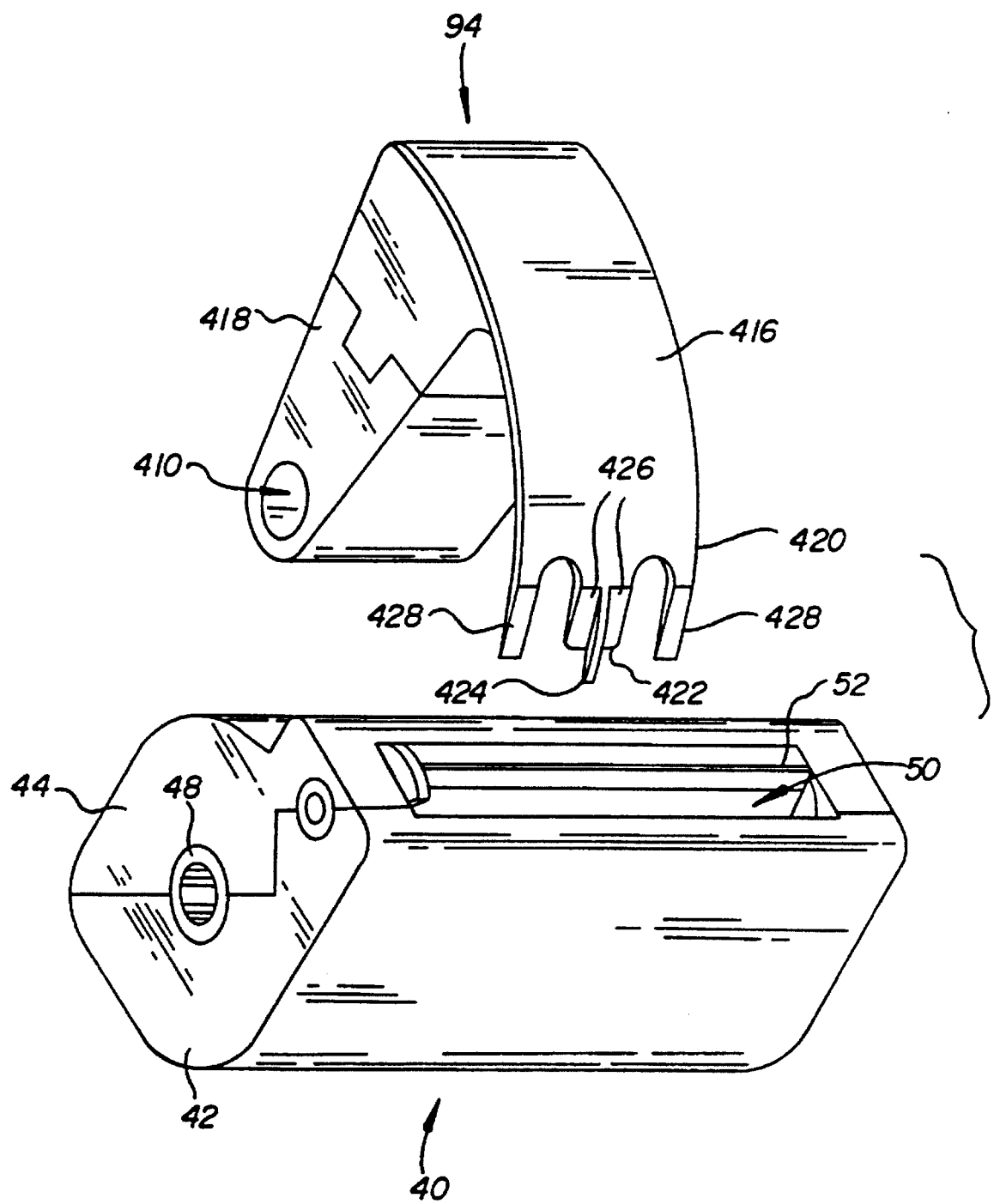
FIG. 35 shows a fragmentary, perspective view of the tool of FIG. 34, poised opposite a cartridge into which a film strip is to be inserted and attached.

FIGS. 27 to 30, 34 and 35 show details of tool 94 and its attachment to rotate plate 378. Tool 94 and its actuating mechanism will be understood to comprise means for engaging the attachment end of the strip, inserting the end into the cartridge, and attaching the end to the core of the spool. A mounting bracket 406 is suitably attached to a front surface of rotate plate 378 and includes a downwardly depended portion 408. A shaft 410 is rotatably supported by portion 408. At an inboard end of shaft 410, a sensor arm 412 is fixedly attached to shaft 410 and extends radially from the shaft sufficiently to influence a proximity sensor 414 also attached to the front surface of rotate plate 378. As also disclosed in commonly assigned, copending U.S. Ser. No. 08/172,006 filed 22 December 1993 by our colleagues Thomas C. Merle, Dale W. Ryan and David L. Bowden, tool 94 includes a circularly curved, preferably metal blade 4 16 which engages attachment end 60, inserts the end through opening 50 and attaches the end to core 54. A radially extended base 418 is fixedly mounted to an outboard end of shaft 410. As best seen in FIG. 35, a terminal end 420 of blade 416 includes a central engagement member or tine 422 which engages length 54 just behind hole 64 in attachment end 60. Extended circumferentially from member 422 is a central retaining finger 424 which extends through oblong opening 64 when tool 94 engages the attachment end. On either side of finger 424, member 422 includes support surfaces 426 which engage length 58 on an opposite side of the length from finger 424. On either side of engagement member 422, blade 416 includes additional support members or tines 428 which engage length 58 on the same side as support surfaces 426. Finally, sensor arm 4 12 fixedly supports a pivot pin 430 to which an actuator mechanism is attached for rotating tool 94, as will be described subsequently.

Rotation of Plate 378 and Actuation of Tool 94

With reference to FIGS. 4, 27 to 30 and 34, features of the invention may be understood which rotate plate 378 and actuate tool 94. Behind face plate 70, a plate cam 432 is fixedly mounted for rotation with line shaft 294. A cam follower 434 engages cam 432 and is rotatably supported at an inboard end of a bell crank 436 which is supported on a pivot shaft 438. An adjustable length actuator 439 is pivotably connected between face plate 70 and crank 436, to maintain engagement between follower 434 and cam plate 432. Actuator 439 also may be used in inhibit actuation of tool 94 by disengaging Follower 434 from cam plate 432. At an outboard end, crank 436 is pivotably connected to an actuator link 440 which is pivotably connected to a moveable portion 442 of a slide 444 mounted on the front surface of the face plate, as best seen in FIGS. 4 and 27. Mounted to moveable portion 442 is a cam plate 448 having a curved cam slot 450. A bracket plate 452 is mounted to rotate plate 378 and rotatably supports a pivot shaft 454. On an inboard end of shaft 454, a cam follower link 456 is fixedly mounted. A cam follower 458, shown in FIGS. 4, 7 and 27, is attached to link 456 and rides in cam slot 450. On an outboard end of shaft 454, a link 460 is fixedly mounted. A conventional air spring link 462 is pivotably attached to one end of link 460. At its upper, rod end, link 462 includes a clevis 464, shown in FIG. 28, which is pivotably attached to pivot pin 430. As seen in FIG. 28, a conventional air spring link 466 is pivotably attached at its upper end 468 to rotate plate 378 and at its lower end 470 to cam follower link 456. Thus, link 466 acts to maintain good engagement between cam follower 458 and cam slot 450.

As cam plate 432 rotates, bell crank 436 pivots to raise link 440 and cause portion 42 to move upward, as viewed in FIG. 4. This movement causes cam follower 458 to move upward along cam slot 450, thereby causing cam follower link 456 to rotate shaft 54. Link 460 thus pulls downward on actuator 462, which causes sensor arm 412 to rotate shaft 4 10 and thereby rotate tool 94 to engage attachment end 60, insert the end into cartridge 40 and engage the end with core 54. Thus, the profile of cam plate 432 is determined by the cycles of movement of the shuttle mechanism and the winding motor. To ensure a secure attachment of end 60 to core 54, cam plate 432 may overdrive tool 94 slightly, thus applying tension to link 462 which will extend to prevent an overload situation. Sensor 4 14 responds to the presence of arm 412 to indicate that tool 94 has been actuated. Cam plate 432 continues to rotate, causing bell crank to pivot to lower link 440 and cause tool 94 to rotate out of the cartridge and back to the position of Figure 8. During this movement, portion 442 slides downward to a position where the center of curvature of cam slot 450 is coincident with the center of rotation of rotate plate 378. This ensures that rotation of plate 378 will not cause any movement of tool 94 from its retracted position. This is because, as plate 378 rotates, bracket plate 452 will drag cam follower 458 along cam slot 450 without causing any rotation about pivot shaft 454, thus maintaining the position of actuator 462 relative to tool 94 and preventing rotation of the tool during winding.

The mechanism for rotating plate 378 is shown in FIGS. 4, 27 and 29. A bell crank 472, shown fragmentarily in FIG. 27, is essentially identical in geometry to bell crank 436. A cam follower 474, shown in dashed lines in FIG. 4, is mounted on an inboard end of crank 472 and engages a second cam plate 432', shown in FIG. 20, also mounted for rotation with line shaft 294. Those skilled in the art will appreciate that the profile of cam plate 432' is determined by the winding velocity profile of quill shaft 356. An inboard end of crank 472 is pivotably attached to a lower end of an actuator link 476 whose upper end is pivotably connected to a radial attachment flange 478 on rotate plate 378, as seen in FIGS. 4 and 29.

As crank 472 pivots in response to rotation of cam plate 432', link 476 is lowered during winding of a strip into cartridge 40. This causes plate 378 and air bar 92 to rotate clockwise as seen in FIGS. 28 to 30. As a result of this rotation, air bar 92 is rotated about pivot axis 69 to cause the direction of the path of the film into the cartridge to be adjusted to prevent the film from contacting the peripheral edges or walls of opening 50. Preferably, when plate 378 reaches its final position of FIG. 30, the path of the film extending upstream through die press 84 will be essentially parallel to the die shoes, to facilitate cutting of the film.

Parts List

The invention has been described using the following reference numerals to identify the parts and features described:
40 . . . cartridge for web material
42 . . . first enclosing shell half
44 . . . second enclosing shell half
46 . . . spool mounted for rotation within 42, 44
48 . . . axially extended hub of 46, engageably externally of 42, 44
50 . . . axially extended opening
51 . . . bore in 53
52 . . . selectively openable and closeable light-shielding door
53 . . . axial hub on 52
54 . . . core of 46
56 . . . attachment features on 54
58 . . . length of web material
60 . . . attachment end of 589
62 . . . pair of attachment openings in 60
64 . . . drive opening in 60
65 . . . opening for detection by film processing equipment
66 . . . minimum diameter of wound roll of web
68 . . . maximum diameter of wound roll
69 . . . intersection line or pivot axis of web paths to wound rolls of diameters 66, 68
70 . . . face plate
72 . . . source of web
74 . . . fixed roller
76 . . . fixed convex air bar
78 . . . vacuum metering drum
80 . . . servo-motor for vacuum drum
82 . . . miniature vacuum box
84 . . . punch and die press
86 . . . shuttle mechanism
88 . . . vacuum head
90 . . . winding station
92 . . . pivotable air bar for adjusting path of 58 into 40
94 . . . tool for engaging, inserting and attaching 58 to 54, 56
96 . . . linear slide on 70
98 . . . Z-shaped shuttle arm
100 . . . drive end of 98
102 . . . upward flange at 100
104 . . . drive link
106 . . . clevis end of 104
108 . . . cam follower
110 . . . pin for 108
112 . . . arcuate cam slot
114 . . . actuator arm
116 . . . oscillating drive
118 . . . adapter block
120 . . . upper cylinder mount
122 . . . lower cylinder mount
124 . . . rodless cylinder
126 . . . output member
128 . . . downwardly extended support plate
130 . . . clamp bar
132 . . . spacers
134 . . . bolts
135 . . . lower edge of 128
136 . . . slider on 110 between 130, 135
137 . . . keeper plate
138 . . . bearing pad against 114
139 . . . proximity detector
140 . . . pick-up end of 98
142 . . . transverse pivot shaft
144 . . . cam follower link
146 . . . cam follower
148 . . . dipper cam slot
158 . . . dipper cam link
160 . . . pivot mount to 70 for 158
162 . . . housing
164 . . . orifice plate
165 . . . orifices in 164
166 . . . curved lead surface to clear tool 94
168 . . . pneumatic fitting
178 . . . passage in 162
180, 182 . . . transverse plenums
184 . . . plenum in 164
186 . . . box frame
188 . . . four-throw crank
190, 192 . . . end bearings for 188
194 . . . outboard, central throw
196 . . . adjustable length crank arm
200 . . . integral, adjustable length actuator
202 . . . lower end of 196
204 . . . passage in 206
206 . . . bottom wall of 186
208 . . . pivot joint
210 . . . upper press platen
212 . . . pair of linear ball bushings or guides
214 . . . outboard throw
216 . . . inboard throw
218, 220 . . . crank arms
222, 224 . . . passages in 206
226 . . . lower press platen
228 . . . bearings 230 ... stub shaft
232 ... cone clamp
234 ... clamping boll
236 ... outside collar
238 ... compression spring
240 ... inside collar
242 ... bearing clamp
244 ... opening through 226 for scrap removal
246 ... vacuum chute for scrap removal
248 ... rejected strip removal chute
250 ... inboard, central throw
252 ... adjustable length crank arm
254 ... integral, adjustable length actuator
256 ... rod end of 254
258 ... link
259 ... proximity detector
260 ... lower die shoe
262 ... upper die shoe
264 ... linear ball bushings or guides
266 ... bellows
268 ... punch for 60
270 ... punches for 62
272 ... oblong punch for 64
274 ... punch for 65
276 ... die
278 ... stripper plate
280 ... compression spring
284 ... slot to pass 158
286 ... pocket for 88 behind 268-274
287 ... reducer
288 ... motor
289 ... reducer
290 ... reducer
292 ... chain
294 ... main line shaft
206 ... phase adjuster
298 ... chain
299 ... phase adjuster
300 ... intermittent drive
302 ... phase adjuster
304 ... chain
320 ... disk cam
322 ... circumferential slot
324 ... mounting bracket on 70
326 ... drive link
328 ... pivot shaft
330 ... shaft block
332 ... inboard quill shaft to rotate with spool 48
334 ... cam follower on 330
336 ... linear bearing on back of 70 for 332
338 ... linear bearing on front of 70 for 332
340 ... cylindrical housing for 338
342 ... rotatable inboard quill head
344 ... outboard end of 332
346 ... actuator link pivoted to 326
348 ... spline shaft pivoted to 346
350 ... linear bearing on front of 70 for 348
352 ... depending motor support arm
354 ... winding motor
356 ... outboard quill to rotate spool 48
360 ... motor housing
362 ... front cover
364 ... bore for 356
368 ... anti-rotation pin
370 ... retainer clip
374 ... pair of bearings on 340
376 ... hollow cylinder on 374

378 ... rotate plate supported on 376
380 ... central hole in 378
382 ... mounting bracket for air bar 92
384 ... body
386 ... internal plenum
388 ... convex, smooth surface
390 ... air flow holes
392 ... internal passage in 384
394 ... cross bore
395 ... downstream lip of surface 388
396 ... row of holes aimed at door 52
398 ... row of holes aimed at lead end of 58
400 ... side plates
402 ... pneumatic fitting for 386, 390
404 ... pneumatic fitting for 392, 396,398
406 ... mounting bracket for tool 94
408 ... depending portion of 406
410 ... shaft
412 ... sensor arm
414 ... sensor on 378
416 ... curved blade
418 ... radially extended base of 94
420 ... terminal end of 416
422 ... central engaging member or tine of 416
424 ... retaining finger
426 ... support surfaces adjacent 424
428 ... outboard support members or tines
430 ... pivot pin on 412
432 ... plate cam on 294
432' ... cam plate on 294
434 ... cam follower
436 ... bell crank arn
438 ... pivot shaft
439 ... adjustable length actuator
440 ... actuator link
442 ... movable part of slide
444 ... slide on 70
448 ... cam plate
450 ... curved cam slot
452 ... bracket plate on 378
454 ... pivot shaft
456 ... cam follower link on 454
458 ... cam follower on 456
460 ... link on 454
462 ... air spring link
464 ... clevis to 430
466 ... air spring link
468 ... rod end of 466
470 ... head end of 466
472 ... bell crank, shown fragmentarily
474 ... cam follower
476 ... actuator link
478 ... radially extended attachment flange on 378

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. A method for winding a strip of web into a cartridge, the cartridge including an enclosing shell; a spool mounted for rotation within the shell; the spool being engageable externally of the cartridge for rotation; the spool comprising a core with features for attaching an end of the strip of web; an axially extended opening through the shell for advancing the strip of web into or withdrawing the strip of web from the shell; and a selectively openable and closeable door for the opening, the method comprising steps of:

gripping a length of web near the end to be attached to the spool;

while gripping the length of web, moving the end toward the opening;

outside the opening, engaging the end;

to after the engaging, ungripping the length;

while engaging the end, inserting the end through the opening and attaching the end to the core;

rotating the spool to draw the length of web along a path through the opening into the cartridge and to wind the length of web onto the spool; and during the rotating, adjusting the direction of the path to prevent the web from contacting peripheral edges or walls of the opening.

2. A method according to claim 1, wherein the web is provided from a source of indeterminate length, further comprising steps of:

stopping the rotating;

cutting a length of the web to provide a strip of web to be drawn into the cartridge; and again rotating the spool to complete drawing the strip of web into the cartridge.

3. A method according to claim 2, further comprising steps of:

repeating the gripping; moving; engaging and ungripping; inserting and attaching; rotating; stopping; cutting; again rotating; and adjusting steps for subsequent strips of web.

4. A method according to claim 3, wherein a particular strip includes a defect further comprising steps of:

before the engaging, directing the detective strip to a scrap removal system;

cutting the defective strip from the length of web; and continuing the gripping; moving; engaging and ungripping; inserting and attaching; rotating; stopping, cutting; again rotating; and adjusting steps for subsequent strips of web.

5. A method according to claim 1, wherein the adjusting is accomplished by:

passing the web over an air bar having a surface curved convexly toward the web; and rotating the air bar to move the path.

6. A method according to claim 5, wherein the air bar is rotated about a pivot axis transverse to the path and within the opening into the shell.

7. A method according to claim 1, further comprising a step of holding the shell of the cartridge stationary during the inserting, attaching, rotating and adjusting steps.

8. A method according to claim 1, further comprising steps of:

prior to the gripping, wrapping the web onto a metering drum;

after the gripping and during the moving, rotating the metering drum faster than a speed of moving the end, to advance the length of web a further portion sufficient to permit the inserting and attaching, and then stopping the metering drum;

during the rotating of the metering dram, accumulating the further portion of the web;

during the inserting and attaching, releasing the further portion of the web; and during the rotating of the spool, again rotating the metering drum.

9. A method according to claim 8, further comprising a step of:

during the inserting and attaching, applying tension to the web to ensure proper attachment of the end to the core.

10. A method according to claim 1, further comprising a step of:

prior to the engaging, directing a flow of air at the end to be engaged, to deflect the end of the web to a position for the engaging.

11. A method according to claim 1, further comprising a step of:

prior to the inserting, directing a flow of air at the door for the opening, to hold the door against closing before the inserting.

12. A method according to claim 1, wherein a particular strip includes a defect, further comprising steps of:

before the engaging, directing the defective strip to a scrap removal system; and continuing the gripping; moving; engaging and ungripping; inserting and attaching; rotating; and adjusting steps for subsequent strips of web.

13. Apparatus according to claim 1, further comprising a step of:

during the moving, reorienting the end of the strip to facilitate the attaching.

14. Apparatus for winding a strip of web into a cartridge, the cartridge including an enclosing shell; a spool mounted for rotation within the shell; the spool being engageable externally of the cartridge for rotation; the spool comprising a core with features for attaching an end of the strip of web: an axially extended opening through the shell for advancing the strip of web into or withdrawing the strip of web from the shell; and a selectively openable and closeable door for the opening, the apparatus comprising:

a frame;

shuttle means for gripping a length of web near an end to be attached to the spool and for moving the end relative to the frame and toward the opening;

means, positioned outside the opening, for engaging the end, inserting the end through the opening and attaching the end to the core;

means for rotating the spool to draw the length of web along a path through the opening and into the cartridge and to wind the length of web onto the spool; and means, effective during the rotating, for adjusting the path of movement of the web into the cartridge to prevent the web from contacting peripheral edges of the opening.

15. Apparatus according to claim 14, further comprising:

means for holding the cartridge stationary relative to the frame.

16. Apparatus according to claims 14, further comprising:

means for cutting the length of web to provide a strip of web to be drawn into the cartridge, and means for synchronizing operation of the means for gripping and the means for cutting.

17. Apparatus according to claim 16, wherein a particular strip includes a defect, further comprising:

means for directing a defective strip to a scrap removal system.

18. Apparatus according to claim 14, wherein the means for adjusting the path comprises:

an air bar having a surface curved convexly toward the web; and means for rotating the air bar to move the path.

19. Apparatus according to claim 18, wherein the air bar is rotated about a pivot axis trails verse to the path and within the opening into the shell.

20. Apparatus according to claim 14, wherein the means for adjusting comprises:

a support plate mounted for rotation relative to the frame about a pivot axis transverse to the path and within the opening into the shell;

an air bar having a surface curved convexly toward the web, the air bar being mounted on the support plate and positioned outside the opening; and means for rotating the support plate, thereby rotating the air bar about the pivot axis to move the path.

21. Apparatus according to claim 20, wherein the means for engaging the end of the web comprises:

an attach blade pivotably mounted on the support plate; and means for rotating the attach blade to engage the end of the web, insert the end through the opening and attach the end to the core.

22. Apparatus according to claim 21, wherein the means for rotating the attach blade comprises:

a slide fixedly mounted relative to the frame;

a curved cam mounted for movement on the slide;

a cam follower operatively associated with the curved cam;

a drive arm pivotably supported by the support plate, the cam follower being pivotably connected to the drive arm;

a link pivotably connected between the drive arm and the attach blade; and means for moving the curved cam along the slide, whereby the cam follower causes the drive arm to rotate, thereby causing the link to rotate the attach blade.

23. Apparatus according to claim 22, wherein the means for moving the curved cam moves the cam between a first position in which the attach blade is disengaged from the end of the strip and a second position in which the attach blade attaches the end of the strip to the core; and the curved cam has a center of curvature concentric with the pivot axis in the first position.

24. Apparatus according to claim 22, wherein the link comprises a length adjustable portion which can extend when the end is attached to the core, to provide overload protection.

25. Apparatus according to claim 14, further comprising:

a metering drum upstream of the shuttle means;

means, downstream of the metering drum, for accumulating a further portion of the web, the further portion to be released as the end is inserted through the opening and attached to the core.

26. Apparatus according to claim 25, wherein the means for accumulating also applies tension to the web to prevent disengagement from the means for engaging and to ensure proper attachment of the end to the core.

27. Apparatus according to claim 14, further comprising:

means for directing a flow of air at the end to be engaged, to deflect the end to a position for the engaging.

28. Apparatus according to claim 14, further comprising means for directing flow of air at the door for the opening, to hold the door against closing before the inserting.

* * * * *